United States Patent
Peng et al.

(10) Patent No.: US 8,493,351 B2
(45) Date of Patent: Jul. 23, 2013

(54) APPARATUS AND METHOD FOR REDUCING AVERAGE SCAN RATE TO DETECT A CONDUCTIVE OBJECT ON A SENSING DEVICE

(75) Inventors: Tao Peng, Shanghai (CN); Zheng Qin, Shanghai (CN)

(73) Assignee: Cypress Semiconductor Corporation, San Jose, CA (US)

( * ) Notice: Subject to any disclaimer, the term of this patent is extended or adjusted under 35 U.S.C. 154(b) by 214 days.

(21) Appl. No.: 13/047,035

(22) Filed: Mar. 14, 2011

(65) Prior Publication Data

US 2012/0044194 A1 Feb. 23, 2012

Related U.S. Application Data

(63) Continuation of application No. 11/396,179, filed on Mar. 30, 2006, now Pat. No. 8,144,125.

(51) Int. Cl.
*G06F 3/045* (2006.01)
(52) U.S. Cl.
USPC .......................................... 345/173; 178/18.06
(58) Field of Classification Search
USPC .............. 345/173–178; 178/18.01–18.11
See application file for complete search history.

(56) References Cited

U.S. PATENT DOCUMENTS

| | | | |
|---|---|---|---|
| 3,696,908 A | 10/1972 | Gluck et al. | |
| 3,750,113 A | 7/1973 | Cencel | |
| 4,103,252 A | 7/1978 | Bobick | |
| 4,157,539 A | 6/1979 | Hunts et al. | |
| 4,163,222 A | 7/1979 | Grove | |
| 4,175,239 A | 11/1979 | Sandler | |
| 4,235,871 A | 11/1980 | Papahadjopoulos et al. | |
| 4,264,903 A | 4/1981 | Bigelow | |
| 4,266,144 A | 5/1981 | Bristol | |
| 4,283,713 A | 8/1981 | Philipp | |
| 4,293,734 A | 10/1981 | Pepper, Jr. | |
| 4,305,135 A | 12/1981 | Dahl et al. | |
| 4,340,777 A | 7/1982 | DeCosta et al. | |
| 4,405,917 A | 9/1983 | Chai | |
| 4,405,918 A | 9/1983 | Wall et al. | |

(Continued)

FOREIGN PATENT DOCUMENTS

| | | | |
|---|---|---|---|
| EP | 0574213 A | 12/1993 | |
| WO | 0002188 A | 1/2000 | |
| WO | WO0002188 A1 | 1/2000 | |

OTHER PUBLICATIONS

"The Virtual Keyboard: I-Tech Bluetooth/Serial Virtual Laser Keyboard Available Now!" The Virtual Laser Keyboard (VKB) Online Worldwide Shop, <http://www.virtual-laser-keyboard.com>, downloaded Apr. 13, 2006; 4 pages.

(Continued)

*Primary Examiner* — Koosha Sharifi-Tafreshi

(57) ABSTRACT

A switch circuit and method is described. In one embodiment, the switch circuit is configured to couple each of a plurality of plurality of capacitive sense elements and a plurality of capacitance sensors in different modes. In a first mode, the switch circuit is configured to couple each of the plurality of capacitance sensors to a group of two or more of the plurality of capacitive sense elements. In a second mode, the switch circuit is configured to couple the plurality of capacitance sensors to individual ones of the two or more of the plurality of capacitive sense elements in one of the groups.

20 Claims, 15 Drawing Sheets

U.S. PATENT DOCUMENTS

| | | |
|---|---|---|
| 4,438,404 A | 3/1984 | Philipp |
| 4,475,151 A | 10/1984 | Philipp |
| 4,495,485 A | 1/1985 | Smith |
| 4,497,575 A | 2/1985 | Philipp |
| 4,550,221 A | 10/1985 | Mabusth |
| 4,560,830 A * | 12/1985 | Perl .................... 178/18.07 |
| 4,727,767 A | 3/1988 | Aiki et al. |
| 4,736,097 A | 4/1988 | Philipp |
| 4,736,191 A | 4/1988 | Matzke et al. |
| 4,737,768 A | 4/1988 | Lewiner et al. |
| 4,742,331 A | 5/1988 | Barrow et al. |
| 4,772,874 A | 9/1988 | Hasegawa |
| 4,772,983 A | 9/1988 | Kerber et al. |
| 4,773,024 A | 9/1988 | Faggin et al. |
| 4,802,103 A | 1/1989 | Faggin et al. |
| 4,876,534 A | 10/1989 | Mead et al. |
| 4,879,461 A | 11/1989 | Philipp |
| 4,879,505 A | 11/1989 | Barrow et al. |
| 4,879,508 A | 11/1989 | Andermo |
| 4,920,399 A | 4/1990 | Hall |
| 4,935,702 A | 6/1990 | Mead et al. |
| 4,940,980 A | 7/1990 | Tice |
| 4,953,928 A | 9/1990 | Anderson et al. |
| 4,954,823 A | 9/1990 | Binstead |
| 4,962,342 A | 10/1990 | Mead et al. |
| 4,977,480 A | 12/1990 | Nishihara |
| 5,049,758 A | 9/1991 | Mead et al. |
| 5,055,827 A | 10/1991 | Philipp |
| 5,059,920 A | 10/1991 | Anderson et al. |
| 5,068,622 A | 11/1991 | Mead et al. |
| 5,073,759 A | 12/1991 | Mead et al. |
| 5,083,044 A | 1/1992 | Mead et al. |
| 5,095,284 A | 3/1992 | Mead |
| 5,097,305 A | 3/1992 | Mead et al. |
| 5,107,149 A | 4/1992 | Platt et al. |
| 5,109,261 A | 4/1992 | Mead et al. |
| 5,119,038 A | 6/1992 | Anderson et al. |
| 5,120,996 A | 6/1992 | Mead et al. |
| 5,122,800 A | 6/1992 | Philipp |
| 5,126,685 A | 6/1992 | Platt et al. |
| 5,146,106 A | 9/1992 | Anderson et al. |
| 5,160,899 A | 11/1992 | Anderson et al. |
| 5,165,054 A | 11/1992 | Platt et al. |
| 5,166,562 A | 11/1992 | Allen et al. |
| 5,204,549 A | 4/1993 | Platt et al. |
| 5,237,879 A | 8/1993 | Speeter |
| 5,243,554 A | 9/1993 | Allen et al. |
| 5,248,873 A | 9/1993 | Allen et al. |
| 5,260,592 A | 11/1993 | Mead et al. |
| 5,270,963 A | 12/1993 | Allen et al. |
| 5,274,371 A | 12/1993 | Yang et al. |
| 5,276,407 A | 1/1994 | Mead et al. |
| 5,281,862 A | 1/1994 | Ma |
| 5,289,023 A | 2/1994 | Mead |
| 5,294,889 A | 3/1994 | Heep et al. |
| 5,303,329 A | 4/1994 | Mead et al. |
| 5,305,017 A | 4/1994 | Gerpheide |
| 5,324,958 A | 6/1994 | Mead et al. |
| 5,331,215 A | 7/1994 | Allen et al. |
| 5,336,936 A | 8/1994 | Allen et al. |
| 5,339,213 A | 8/1994 | O'Callaghan |
| 5,349,303 A | 9/1994 | Gerpheide |
| 5,374,787 A | 12/1994 | Miller et al. |
| 5,381,515 A | 1/1995 | Platt et al. |
| 5,384,467 A | 1/1995 | Plimon et al. |
| 5,408,194 A | 4/1995 | Steinbach et al. |
| 5,412,387 A | 5/1995 | Vincelette et al. |
| 5,424,756 A | 6/1995 | Ho et al. |
| 5,463,388 A | 10/1995 | Boie et al. |
| 5,488,204 A | 1/1996 | Mead et al. |
| 5,495,077 A | 2/1996 | Miller et al. |
| 5,499,026 A | 3/1996 | Liao et al. |
| 5,508,700 A | 4/1996 | Taylor et al. |
| 5,541,878 A | 7/1996 | Lemoncheck et al. |
| 5,543,588 A | 8/1996 | Bisset et al. |
| 5,543,590 A | 8/1996 | Gillespie et al. |
| 5,543,591 A | 8/1996 | Gillespie et al. |
| 5,555,907 A | 9/1996 | Philipp |
| 5,565,658 A | 10/1996 | Gerpheide et al. |
| 5,566,702 A | 10/1996 | Philipp |
| 5,572,205 A | 11/1996 | Caldwell et al. |
| 5,629,891 A | 5/1997 | Lemoncheck et al. |
| 5,648,642 A | 7/1997 | Miller et al. |
| 5,670,915 A | 9/1997 | Cooper et al. |
| 5,672,959 A | 9/1997 | Der |
| 5,682,032 A | 10/1997 | Philipp |
| 5,684,487 A | 11/1997 | Timko |
| 5,691,513 A * | 11/1997 | Yamamoto et al. ........ 178/18.07 |
| 5,694,063 A | 12/1997 | Burlison et al. |
| 5,730,165 A | 3/1998 | Philipp |
| 5,748,185 A | 5/1998 | Stephan et al. |
| 5,757,368 A | 5/1998 | Gerpheide et al. |
| 5,763,909 A | 6/1998 | Mead et al. |
| 5,763,924 A | 6/1998 | Lum et al. |
| 5,767,457 A | 6/1998 | Gerpheide et al. |
| 5,796,183 A | 8/1998 | Hourmand et al. |
| 5,812,698 A | 9/1998 | Platt et al. |
| 5,841,078 A | 11/1998 | Miller et al. |
| 5,844,265 A | 12/1998 | Mead et al. |
| 5,844,506 A | 12/1998 | Binstead |
| 5,854,625 A | 12/1998 | Frisch et al. |
| 5,856,822 A | 1/1999 | Du et al. |
| 5,861,583 A | 1/1999 | Schediwy et al. |
| 5,861,875 A | 1/1999 | Gerpheide |
| 5,864,242 A | 1/1999 | Allen et al. |
| 5,864,392 A | 1/1999 | Winklhofer et al. |
| 5,872,561 A | 2/1999 | Figie et al. |
| 5,880,411 A | 3/1999 | Gillespie et al. |
| 5,889,236 A | 3/1999 | Gillespie et al. |
| 5,914,465 A | 6/1999 | Allen et al. |
| 5,914,708 A | 6/1999 | Lagrange et al. |
| 5,920,309 A | 7/1999 | Bisset et al. |
| 5,920,310 A | 7/1999 | Faggin et al. |
| 5,926,566 A | 7/1999 | Wang et al. |
| 5,942,733 A | 8/1999 | Allen et al. |
| 5,943,052 A | 8/1999 | Allen et al. |
| 5,949,264 A | 9/1999 | Lo |
| 5,969,513 A | 10/1999 | Clark |
| 6,023,422 A | 2/2000 | Allen et al. |
| 6,025,726 A | 2/2000 | Gershenfeld et al. |
| 6,028,271 A | 2/2000 | Gillespie et al. |
| 6,028,959 A | 2/2000 | Wang et al. |
| 6,037,929 A | 3/2000 | Ogura et al. |
| 6,067,019 A | 5/2000 | Scott |
| 6,097,432 A | 8/2000 | Mead et al. |
| 6,140,853 A | 10/2000 | Lo |
| 6,148,104 A | 11/2000 | Wang et al. |
| 6,185,450 B1 | 2/2001 | Seguine et al. |
| 6,188,228 B1 | 2/2001 | Philipp |
| 6,188,391 B1 | 2/2001 | Seely et al. |
| 6,222,528 B1 | 4/2001 | Gerpheide et al. |
| 6,239,389 B1 | 5/2001 | Allen et al. |
| 6,249,447 B1 | 6/2001 | Boylan et al. |
| 6,262,717 B1 | 7/2001 | Donohue et al. |
| 6,271,719 B1 | 8/2001 | Sevastopoulos |
| 6,271,720 B1 | 8/2001 | Sevastopoulos |
| 6,278,283 B1 | 8/2001 | Tsugai |
| 6,280,391 B1 | 8/2001 | Olson et al. |
| 6,288,707 B1 | 9/2001 | Philipp |
| 6,304,014 B1 | 10/2001 | England et al. |
| 6,320,184 B1 | 11/2001 | Winklhofer et al. |
| 6,323,846 B1 | 11/2001 | Westerman et al. |
| 6,326,859 B1 | 12/2001 | Goldman et al. |
| 6,342,817 B1 | 1/2002 | Crofts et al. |
| 6,344,773 B1 | 2/2002 | Sevastopoulos et al. |
| 6,377,009 B1 | 4/2002 | Philipp |
| 6,380,929 B1 | 4/2002 | Platt |
| 6,380,931 B1 | 4/2002 | Gillespie et al. |
| 6,400,217 B1 | 6/2002 | Bhandari |
| 6,414,671 B1 | 7/2002 | Gillespie et al. |
| 6,430,305 B1 | 8/2002 | Decker |
| 6,441,073 B1 | 8/2002 | Tanaka et al. |
| 6,441,682 B1 | 8/2002 | Vinn et al. |
| 6,445,257 B1 | 9/2002 | Cox et al. |
| 6,452,514 B1 | 9/2002 | Philipp |
| 6,457,355 B1 | 10/2002 | Philipp |
| 6,459,321 B1 | 10/2002 | Belch |

| | | |
|---|---|---|
| 6,466,036 B1 | 10/2002 | Philipp |
| 6,473,069 B1 | 10/2002 | Gerpheide |
| 6,489,899 B1 | 12/2002 | Ely et al. |
| 6,498,720 B2 | 12/2002 | Glad |
| 6,499,359 B1 | 12/2002 | Washeleski et al. |
| 6,504,530 B1 | 1/2003 | Wilson et al. |
| 6,522,083 B1 | 2/2003 | Roach |
| 6,522,128 B1 | 2/2003 | Ely et al. |
| 6,522,187 B1 | 2/2003 | Sousa |
| 6,523,416 B2 | 2/2003 | Takagi et al. |
| 6,529,015 B2 | 3/2003 | Nonoyama et al. |
| 6,534,970 B1 | 3/2003 | Ely et al. |
| 6,535,200 B2 | 3/2003 | Philipp |
| 6,570,557 B1 | 5/2003 | Westerman et al. |
| 6,574,095 B2 | 6/2003 | Suzuki |
| 6,587,093 B1 | 7/2003 | Shaw et al. |
| 6,597,347 B1 | 7/2003 | Yasutake |
| 6,610,936 B2 | 8/2003 | Gillespie et al. |
| 6,614,313 B2 | 9/2003 | Crofts et al. |
| 6,624,640 B2 | 9/2003 | Lund et al. |
| 6,639,586 B2 | 10/2003 | Gerpheide |
| 6,642,857 B1 | 11/2003 | Schediwy et al. |
| 6,649,924 B1 | 11/2003 | Philipp et al. |
| 6,667,740 B2 | 12/2003 | Ely et al. |
| 6,673,308 B2 | 1/2004 | Hino et al. |
| 6,677,932 B1 | 1/2004 | Westerman |
| 6,680,731 B2 | 1/2004 | Gerpheide et al. |
| 6,683,462 B2 | 1/2004 | Shimizu |
| 6,690,066 B1 | 2/2004 | Lin et al. |
| 6,704,005 B2 | 3/2004 | Kato et al. |
| 6,705,511 B1 | 3/2004 | Dames et al. |
| 6,714,817 B2 | 3/2004 | Daynes et al. |
| 6,720,777 B2 | 4/2004 | Wang |
| 6,730,863 B2 | 5/2004 | Gerpheide et al. |
| 6,731,121 B1 | 5/2004 | Hsu et al. |
| 6,744,258 B2 | 6/2004 | Ishio et al. |
| 6,750,852 B2 | 6/2004 | Gillespie et al. |
| 6,788,221 B1 | 9/2004 | Ely et al. |
| 6,788,521 B1 | 9/2004 | Nishi |
| 6,798,218 B2 | 9/2004 | Kasperkovitz |
| 6,809,275 B1 | 10/2004 | Cheng et al. |
| 6,825,890 B2 | 11/2004 | Matsufusa |
| 6,839,052 B1 | 1/2005 | Kramer |
| 6,856,433 B2 | 2/2005 | Hatano et al. |
| 6,861,961 B2 | 3/2005 | Sandbach et al. |
| 6,873,203 B1 | 3/2005 | Latham et al. |
| 6,879,215 B1 | 4/2005 | Roach |
| 6,888,536 B2 | 5/2005 | Westerman et al. |
| 6,888,538 B2 | 5/2005 | Ely et al. |
| 6,893,724 B2 | 5/2005 | Lin et al. |
| 6,903,402 B2 | 6/2005 | Miyazawa |
| 6,904,570 B2 | 6/2005 | Foote et al. |
| 6,914,547 B1 | 7/2005 | Swaroop et al. |
| 6,933,873 B1 | 8/2005 | Horsley et al. |
| 6,947,031 B2 | 9/2005 | Sandbach et al. |
| 6,949,811 B2 | 9/2005 | Miyazawa |
| 6,949,937 B2 | 9/2005 | Knoedgen |
| 6,958,594 B2 | 10/2005 | Redl et al. |
| 6,969,978 B2 | 11/2005 | Dening |
| 6,970,126 B1 | 11/2005 | O'Dowd et al. |
| 6,975,123 B1 | 12/2005 | Malang et al. |
| 6,993,607 B2 | 1/2006 | Philipp |
| 7,006,078 B2 | 2/2006 | Kim |
| 7,030,782 B2 | 4/2006 | Ely et al. |
| 7,030,860 B1 | 4/2006 | Hsu et al. |
| 7,032,051 B2 | 4/2006 | Reay et al. |
| 7,046,230 B2 | 5/2006 | Zadesky et al. |
| 7,109,978 B2 | 9/2006 | Gillespie et al. |
| 7,119,550 B2 | 10/2006 | Kitano et al. |
| 7,129,714 B2 | 10/2006 | Baxter |
| 7,129,935 B2 | 10/2006 | Mackey |
| 7,133,140 B2 | 11/2006 | Lukacs et al. |
| 7,133,793 B2 | 11/2006 | Ely et al. |
| 7,141,968 B2 | 11/2006 | Hibbs et al. |
| 7,141,987 B2 | 11/2006 | Hibbs et al. |
| 7,151,276 B2 | 12/2006 | Gerlach et al. |
| 7,151,528 B2 | 12/2006 | Taylor et al. |
| 7,158,056 B2 | 1/2007 | Wright et al. |
| 7,202,655 B2 | 4/2007 | Itoh |
| 7,202,855 B2 | 4/2007 | Shigetaka et al. |
| 7,202,859 B1 | 4/2007 | Speck et al. |
| 7,205,777 B2 | 4/2007 | Schulz et al. |
| 7,212,189 B2 | 5/2007 | Shaw et al |
| 7,224,591 B2 | 5/2007 | Kaishita et al. |
| 7,233,508 B2 | 6/2007 | Itoh |
| 7,245,131 B2 | 7/2007 | Kurachi et al. |
| 7,253,643 B1 | 8/2007 | Seguine |
| 7,288,946 B2 | 10/2007 | Hargreaves et al. |
| 7,288,977 B2 | 10/2007 | Stanley |
| 7,298,124 B2 | 11/2007 | Kan et al. |
| 7,301,350 B2 | 11/2007 | Hargreaves et al. |
| 7,301,351 B2 | 11/2007 | Deangelis et al. |
| 7,307,485 B1 | 12/2007 | Snyder et al. |
| 7,312,616 B2 | 12/2007 | Snyder |
| 7,323,886 B2 | 1/2008 | Lee |
| 7,327,352 B2 | 2/2008 | Keefer et al. |
| 7,362,244 B2 | 4/2008 | Sun |
| 7,362,313 B2 | 4/2008 | Geaghan et al. |
| 7,439,962 B2 | 10/2008 | Reynolds et al. |
| 7,449,895 B2 | 11/2008 | Ely et al. |
| 7,450,113 B2 | 11/2008 | Gillespie et al. |
| 7,453,444 B2 | 11/2008 | Geaghan |
| 7,466,307 B2 | 12/2008 | Trent, Jr. et al. |
| 7,479,949 B2 | 1/2009 | Jobs et al. |
| 7,499,040 B2 | 3/2009 | Zadesky et al. |
| 7,532,205 B2 | 5/2009 | Gillespie et al. |
| 7,539,513 B2 | 5/2009 | Cathey et al. |
| RE40,867 E | 8/2009 | Binstead |
| 7,570,290 B2 | 8/2009 | Yokota et al. |
| 7,580,030 B2 | 8/2009 | Marten |
| 7,598,752 B2 | 10/2009 | Li |
| 7,609,253 B2 | 10/2009 | Trent, Jr. et al. |
| 7,643,011 B2 | 1/2010 | O'Connor et al. |
| 7,663,607 B2 | 2/2010 | Hotelling et al. |
| 7,667,468 B1 | 2/2010 | Anderson |
| 7,730,401 B2 | 6/2010 | Gillespie et al. |
| 7,812,827 B2 * | 10/2010 | Hotelling et al. .............. 345/173 |
| 7,825,905 B2 | 11/2010 | Philipp |
| 7,831,070 B1 | 11/2010 | Cheng et al. |
| 7,932,897 B2 | 4/2011 | Elias et al. |
| 8,068,097 B2 | 11/2011 | Guanghai |
| 8,082,566 B2 | 12/2011 | Stallings |
| 8,093,914 B2 | 1/2012 | Maharyta et al. |
| 8,144,125 B2 | 3/2012 | Peng et al. |
| 8,144,126 B2 | 3/2012 | Wright |
| 8,169,238 B1 | 5/2012 | Maharyta et al. |
| 2002/0063688 A1 | 5/2002 | Shaw et al. |
| 2002/0067348 A1 | 6/2002 | Masters et al. |
| 2002/0191029 A1 | 12/2002 | Gillespie et al. |
| 2003/0025679 A1 | 2/2003 | Taylor et al. |
| 2003/0062889 A1 | 4/2003 | Ely et al. |
| 2003/0063428 A1 | 4/2003 | Nishi |
| 2003/0064326 A1 | 4/2003 | Yamamoto et al. |
| 2003/0080755 A1 | 5/2003 | Kobayashi |
| 2003/0098858 A1 | 5/2003 | Perski et al. |
| 2003/0112021 A1 | 6/2003 | Palata et al. |
| 2003/0156098 A1 | 8/2003 | Shaw et al. |
| 2003/0160808 A1 | 8/2003 | Foote et al. |
| 2003/0183864 A1 | 10/2003 | Miyazawa |
| 2003/0183884 A1 | 10/2003 | Miyazawa |
| 2003/0184315 A1 | 10/2003 | Eberlein |
| 2004/0017355 A1 | 1/2004 | Shim |
| 2004/0056845 A1 | 3/2004 | Harkcom et al. |
| 2004/0169594 A1 | 9/2004 | Ely et al. |
| 2004/0178989 A1 | 9/2004 | Shahoian et al. |
| 2004/0178997 A1 | 9/2004 | Gillespie et al. |
| 2004/0252109 A1 | 12/2004 | Trent et al. |
| 2004/0263864 A1 | 12/2004 | Lukacs et al. |
| 2005/0021269 A1 | 1/2005 | Ely et al. |
| 2005/0023145 A1 | 2/2005 | Cohen et al. |
| 2005/0024341 A1 | 2/2005 | Gillespie et al. |
| 2005/0052429 A1 | 3/2005 | Philipp |
| 2005/0073302 A1 | 4/2005 | Hibbs et al. |
| 2005/0073322 A1 | 4/2005 | Hibbs et al. |
| 2005/0083110 A1 | 4/2005 | Latham et al. |
| 2005/0231487 A1 | 10/2005 | Ming |
| 2005/0270273 A1 | 12/2005 | Marten |
| 2006/0026521 A1 | 2/2006 | Hotelling et al. |

| | | | |
|---|---|---|---|
| 2006/0026536 A1 | 2/2006 | Hotelling et al. |
| 2006/0032680 A1 | 2/2006 | Elias et al. |
| 2006/0066582 A1 | 3/2006 | Lyon et al. |
| 2006/0097991 A1 | 5/2006 | Hotelling et al. |
| 2006/0113974 A1 | 6/2006 | Kan et al. |
| 2006/0139340 A1 | 6/2006 | Geaghan |
| 2006/0139469 A1 | 6/2006 | Yokota et al. |
| 2006/0164142 A1 | 7/2006 | Stanley |
| 2006/0176718 A1 | 8/2006 | Itoh |
| 2006/0192690 A1 | 8/2006 | Philipp |
| 2006/0197752 A1 | 9/2006 | Hurst et al. |
| 2006/0197753 A1 | 9/2006 | Hotelling et al. |
| 2006/0267953 A1 | 11/2006 | Peterson et al. |
| 2006/0273804 A1 | 12/2006 | Delorme et al. |
| 2006/0274042 A1 | 12/2006 | Krah et al. |
| 2007/0008299 A1 | 1/2007 | Hristov |
| 2007/0063876 A1 | 3/2007 | Wong |
| 2007/0074913 A1 | 4/2007 | Geaghan et al. |
| 2007/0132737 A1 | 6/2007 | Mulligan et al. |
| 2007/0164756 A1 | 7/2007 | Lee |
| 2007/0177803 A1 | 8/2007 | Elias et al. |
| 2007/0228256 A1 | 10/2007 | Mentzer et al. |
| 2007/0229466 A1 | 10/2007 | Peng et al. |
| 2007/0229468 A1 | 10/2007 | Peng et al. |
| 2007/0236478 A1 | 10/2007 | Geaghan et al. |
| 2007/0236618 A1 | 10/2007 | Maag et al. |
| 2007/0262962 A1 | 11/2007 | Xiaoping et al. |
| 2007/0268243 A1 | 11/2007 | Choo et al. |
| 2007/0268272 A1 | 11/2007 | Perski et al. |
| 2008/0007434 A1 | 1/2008 | Hristov |
| 2008/0007529 A1 | 1/2008 | Paun et al. |
| 2008/0024455 A1 | 1/2008 | Lee et al. |
| 2008/0041640 A1 | 2/2008 | Gillespie et al. |
| 2008/0042994 A1 | 2/2008 | Gillespie et al. |
| 2008/0048997 A1 | 2/2008 | Gillespie et al. |
| 2008/0062140 A1 | 3/2008 | Hotelling et al. |
| 2008/0084400 A1 | 4/2008 | Rosenberg |
| 2008/0088595 A1 | 4/2008 | Liu et al. |
| 2008/0088602 A1 | 4/2008 | Hotelling et al. |
| 2008/0111714 A1 | 5/2008 | Kremin |
| 2008/0122796 A1 | 5/2008 | Jobs et al. |
| 2008/0165132 A1 | 7/2008 | Weiss et al. |
| 2008/0165140 A1 | 7/2008 | Christie et al. |
| 2008/0165141 A1 | 7/2008 | Christie et al. |
| 2008/0165255 A1 | 7/2008 | Christie et al. |
| 2008/0179112 A1 | 7/2008 | Qin et al. |
| 2008/0192005 A1 | 8/2008 | Elgoyhen et al. |
| 2008/0204426 A1 | 8/2008 | Hotelling et al. |
| 2008/0277171 A1 | 11/2008 | Wright |
| 2008/0278178 A1 | 11/2008 | Philipp |
| 2009/0085894 A1 | 4/2009 | Gandhi et al. |
| 2009/0096758 A1 | 4/2009 | Hotelling et al. |
| 2009/0284478 A1 | 11/2009 | De La Torre Baltierra et al. |
| 2009/0289902 A1 | 11/2009 | Carlvik et al. |
| 2009/0309851 A1 | 12/2009 | Bernstein |
| 2009/0322351 A1 | 12/2009 | Mcleod |
| 2010/0033423 A1 | 2/2010 | Iio |
| 2010/0302198 A1 | 12/2010 | Tasher et al. |
| 2012/0043973 A1 | 2/2012 | Kremin |

OTHER PUBLICATIONS

U.S. Appl. No. 13/049,556: "Reducing Sleep Current in a Capacitance Sensing System," David G. Wilght, filed on Mar. 16, 2011; 57 pages.
U.S. Appl. No. 60/947,865: "Capacitive Field Sensor with Sigma-Delt Modulator," Viktor Kremin, filed on Jul. 3, 2007, 33 pages.
U.S. Appl. No. 61/030,526; "Capacitive Sensing Universal System and Method," Andriy Ryshtun, filed on Feb. 21, 2008: 22 pages.
Chapweske, Adam; "The PS/2 Mouse Interface," PS/2 Mouse Interfacing, 2001, retrieved on May 18, 2006; 11 pages.
Cypress Semiconductor Corporation, "CY8C21x34 Data Sheet," CSR User Module, CSR V.1.0; Oct. 6,2005; 36 pages.
Dennis Seguine, "Capacitive Switch Scan," AN2233a, Application Note, CY8C21x34, Apr. 7, 2005 6 pages.
U.S. Appl. No. 61/108,450: "Alternative Realizations of the CSX (TxRx-I) Sensing Scheme for ITO Panels," Andriy Maharyta, filed on Oct. 24, 2008; 7 pages.
Ryan Seguine et al, "Layout Guidelines for PSoC CapSense", Cypress Application Note AN2292, Revision B, Oct. 31, 2005: all pages.
USPTO Final Rejection for U.S. Appl. No. 11/395,674 dated Jul. 16, 2009; 12 pages.
USPTO Final Rejection for U.S. Appl. No. 11/432,130 dated Nov. 30, 2009; 15 pages.
USPTO Final Rejection for U.S. Appl. No. 11/493,350 dated Jul. 12, 2011; 12 pages.
USPTO Final Rejection for U.S. Appl. No. 21/395,969 dated Jul. 17, 2012; 25 pages.
USPTO Non-Final Rejection for U.S. Appl. No. 11/395,674 dated Feb. 10, 2009: 10 pages.
USPTO Non-Final Rejection for U.S. Appl. No. 11/395,674 dated Apr. 19, 2010; 15 pages.
USPTO Non-Final Rejection for U.S. Appl. No. 11/395,674 dated Nov. 18, 2009; 11 pages.
USPTO Non-Final Rejection for U.S. Appl. No. 11/396,179 dated Mar. 19, 2009; 25 pages.
USPTO Non-Final Rejection for U.S. Appl. No. 11/432,130 dated Mar. 24, 2010: 15 pages.
USPTO Non-Final Rejection for U.S. Appl. No. 11/432,130 dated Jun. 9, 2009; 14 pages.
USPTO Non-Final Rejection for U.S. Appl. No. 11/440,924 dated Jan. 20, 2010; 9 pages.
USPTO Non-Final Rejection for U.S. Appl. No. 11/440,924 dated Mar. 10, 2009: 9 pages.
USPTO Non-Final Rejection for U.S. Appl. No. 11/442,212 dated Feb. 25, 2011; 13 pages.
USPTO Non-Final Rejection for U.S. Appl. No. 11/493,350 dated Mar. 30, 2011, 11 pages.
USPTO Non-Final Rejection for U.S. Appl. No. 11/493,350 dated Jun. 16, 2010: 8 pages.
USPTO Non-Final Rejection for U.S. Appl. No. 11/493,350 dated Nov. 9, 2010; 9 pages.
USPTO Non-Final Rejection for U.S. Appl. No. 12/380,141 dated Sep. 5, 2012; 6 pages.
USPTO Notice of Allowance for U.S. Appl. No. 11/396,179 dated Feb. 2, 2012; 5 pages.
USPTO Notice of Allowance for U.S. Appl. No. 11/396,179 dated Feb. 3, 2011; 10 pages.
USPTO Notice of Allowance for U.S. Appl. No. 11/396,179 dated May 20, 2010: 11 pages.
USPTO Notice of Allowance for U.S. Appl. No. 11/396,179 dated Jul. 1, 2011, 11 pages.
USPTO Notice of Allowance for U.S. Appl. No. 11/396,179 dated Oct. 8, 2009; 7 pages.
USPTO Notice of Allowance for U.S. Appl. No. 11/440,924 dated Sep. 23, 2009: 6 pages.
USPTO Notice of Allowance for U.S. Appl. No. 11/801,115 dated Aug. 4, 2011; 5 pages.
USPTO Notice of Allowance for U.S. Appl. No. 11/801,115 dated Aug. 19, 2010; 10 pages.
USPTO Notice of Allowance for U.S. Appl. No. 11/801,115 dated Dec. 10, 2010; 10 pages.
USPTO Notice of Allowance for U.S. Appl. No. 12/239,692 dated Aug. 15, 2012; 8 pages.
USPTO Notice of Allowance for U.S. Appl. No. 12/395,462 dated Aug. 29, 2012; 5 pages.
USPTO Requirement for Restriction/Election for U.S. Appl. No. 11/432,130 dated Mar. 31, 2009; 6 pages.
Wikipedia, The Free Encyclopedia, "IBM PC Keyboard," http://en.wikipedia org/wiki/PC_keyboard> accessed May 19, 2006; 3 pages.
"CSD User Module Data Sheet," CSD v1.0, Oct. 13, 2006; 58 pages.
U.S. Appl. No. 12/166,228 "Capacitance to Frequency Converter," Andriy Maharyta et al., filed Jul. 1, 2008; 29 pages.
U.S. Appl. No. 13/612,803: "Capacitive Field Sensor with Sigma-Delta Modulator," Andriy Ryshtun, filed Sep. 12, 2012; 56 pages.
U.S. Appl. No. 13/670,671: "System and Method to Measure Capacitance of Capacitive Sensor Array," Nathan Y. Moyal, filed Nov. 7, 2012; 40 pages.
U.S. Appl. No. 13/671,389: "Touch Sensing," Jonathan R. Peterson, filed Nov. 7, 2012; 35 jpages.

U.S. Appl. No. 60/947,871 "Capacitance to Frequency Converter," Andrey Maharita et al., filed Jul. 3, 2007; 21 pages.

Cypress Semiconductor Corporation, "Cypress Introduces PSoC(TM)-Based Capacitive Touch Sensor Solution," Cypress Press Release; May 31, 2005; <http://www.cypress.com/portal/server>; retrieved on Feb. 5, 2007; 4 pages.

Cypress Semiconductor Corporation, "Fan Controller CG6457AM and CG6462AM," PSoC Mixed Signal Array Preliminary Data Sheet; May 24, 2005; 25 pages.

Cypress Semiconductor Corporation, "PSoC CY8C20x34 Technical Reference Manual (TRM)," PSoC CY8C20x34 TRM, Version 1.0, 2006; 218 pages.

Cypress Semiconductor Corporation, "PSoC Mixed-Signal Controllers," Production Description; <http://www.cypress.com/portal/server>; retrieved on Sep. 27, 2005; 2 pages.

Cypress Semiconductor Corporation, "Release Notes sm017," Jan. 24, 2007; 3 pages.

Dave Van Ess, "Understanding Switched Capacitor Analog Blocks," Application Note AN2041, Mar. 30, 2004; 16 pages.

Lee, Mark; "EMC Design Considerations for PSoC CapSense Applications," Cypress Semiconductor Corporation, Application Note AN2318; Sep. 16, 2005; 6 pages.

Mark Lee, "CapSense Best Practices," Cypress Semiconductor Application Note, Oct. 16, 2006; 10 pages.

Sedra, Adel S. et al., "Microelectronic Circuits," 3rd Edition, Oxford University Press, pp. xiii-xx and 861-883, 1991; 20 pages.

Seguine, Ryan; "Layout Guidelines for PSoC CapSense," Cypress Semiconductor Corporation, Application Note AN2292; Jul. 22, 2005; 13 pages.

USPTO Non-Final Rejection for U.S. Appl. No. 12/166,228 dated Aug. 11, 2010; 8 pages.

USPTO Non-Final Rejection for U.S. Appl. No. 12/166,228 dated Dec. 30, 2009; 11 pages.

USPTO Notice of Allowance for U.S. Appl. No. 10/888,666 dated Aug. 2, 2006; 11 pages.

USPTO Notice of Allowance for U.S. Appl. No. 11/396,179 dated Oct. 13, 2011; 7 pages.

USPTO Notice of Allowance for U.S. Appl. No. 11/489,944 dated Apr. 9, 2007; 7 pages.

USPTO Notice of Allowance for U.S. Appl. No. 11/489,944 dated May 24, 2007; 2 pages.

USPTO Notice of Allowance for U.S. Appl. No. 11/801,115 dated Feb. 2, 2012; 10 pages.

USPTO Notice of Allowance for U.S. Appl. No. 11/801,115 dated Nov. 30, 2011; 5 pages.

USPTO Notice of Allowance for U.S. Appl. No. 12/040,387 dated Nov. 8, 2012; 9 pages.

USPTO Notice of Allowance for U.S. Appl. No. 12/239,692 dated Sep. 18, 2012; 8 pages.

USPTO Notice of Allowance for U.S. Appl. No. 12/380,141 dated Nov. 8, 2012; 7 pages.

USPTO Notice of Allowance for U.S. Appl. No. 12/395,462 dated Nov. 14, 2012; 5 pages.

USPTO Notice of Allowance for U.S. Appl. No. 12/606,147 dated Aug. 13, 2012; 7 pages.

USPTO Notice of Allowance for U.S. Appl. No. 13/301,764 dated Oct. 4, 2012; 10 pages.

USPTO Notice of Allowance for U.S. Appl. No. 13/612,803 date Dec. 10, 2012; 8 pages.

USPTO Requirement for Restriction for U.S. Appl. No. 11/396,179 dated Feb. 3, 2009; 6 pages.

Van Ess, David; "Simulating a 555 Timer with PSoC," Cypress Semiconductor Corporation, Application Note AN2286, May 19, 2005; 10 pages.

USPTO Non-Final Rejection for U.S. Appl. No. 13/049,556 dated Jan. 25, 2013; 11 pages.

* cited by examiner

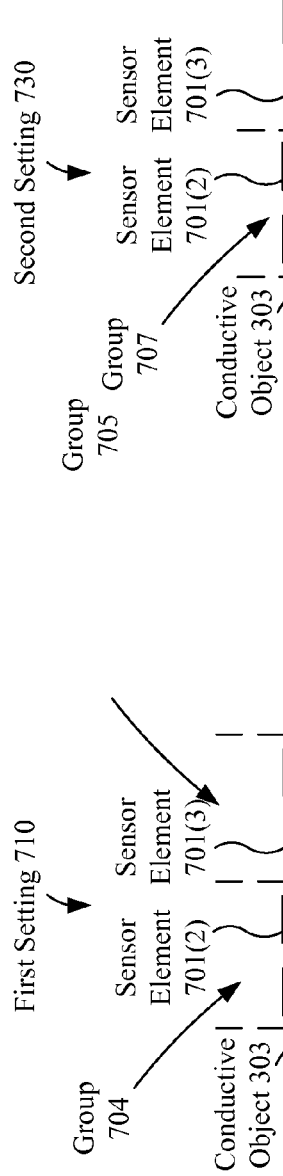
FIG. 7C
FIG. 7B

First Setting 810 (e.g., Course Scan)

First Setting 910 (e.g., Course Scan)

Second Setting 930 (e.g., Fine Scan)

Second Setting 940 (e.g., Dynamic partition of fine scan group)

APPARATUS AND METHOD FOR REDUCING AVERAGE SCAN RATE TO DETECT A CONDUCTIVE OBJECT ON A SENSING DEVICE

RELATED APPLICATIONS

This application is a continuation of U.S. application Ser. No. 11/396,179, filed on Mar. 30, 2006, the entire contents of which are hereby incorporated by reference.

TECHNICAL FIELD

This invention relates to the field of user interface devices and, in particular, to touch-sensing devices.

BACKGROUND

Computing devices, such as notebook computers, personal data assistants (PDAs), and mobile handsets, have user interface devices, which are also known as human interface device (HID). One user interface device that has become more common is a touch-sensor pad. A basic notebook touch-sensor pad emulates the function of a personal computer (PC) mouse. A touch-sensor pad is typically embedded into a PC notebook for built-in portability. A touch-sensor pad replicates mouse x/y movement by using two defined axes which contain a collection of sensor elements that detect the position of a conductive object, such as finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a cursor, or selecting an item on a display. These touch-sensor pads can include multi-dimensional sensor arrays. The sensor array may be one dimensional, detecting movement in one axis. The sensor array may also be two dimensional, detecting movements in two axes.

FIG. 1A illustrates a conventional touch-sensor pad. The touch-sensor pad 100 includes a sensing surface 101 on which a conductive object may be used to position a cursor in the x- and y-axes. Touch-sensor pad 100 may also include two buttons, left and right buttons 102 and 103, respectively. These buttons are typically mechanical buttons, and operate much like a left and right button on a mouse. These buttons permit a user to select items on a display or send other commands to the computing device.

FIG. 1B illustrates a conventional touch-sensor pad. The touch-sensor pad 100 includes a plurality of metal strips 104(1)-104(N), where N is the number of strips. The plurality of metal strips 104(1)-104(N) are coupled to the processing device 105, including a plurality of capacitance sensors 103(1)-103(N). The plurality of metal strips 104(1)-104(N) are configured to determine the location or position of the conductive object 106. For ease of discussion and illustration, only the N parallel running metal strips in only the Y direction (e.g., to detect motion in the x-direction) of the touch-sensor pad 100 have been included. In this conventional design, each capacitance sensor 103 is coupled to a corresponding metal strip 104. In other words, for each sensor element 104, the processing device 105 has a corresponding pin to connect each strip of the touch-sensor pad to the processing device 105. Accordingly, this conventional design uses linear search algorithms to determine the position of the conductive object 106 on the plurality of metal strips. With a linear search algorithm, capacitance variation is detected one by one in a linear fashion. By comparing the capacitance variation between the baseline and the capacitance variation on neighboring metal strips, the position of the conductive object 106 (e.g., X coordinate) is determined. For example, the processing device 103(1) may first detect the capacitance variation on the first metal strip 104(1), then 104(2), and so on, until in detects the conductive object on the seventh metal strip 104(7). If the conductive object is on the first metal strip 104(1), then the processing device 105 only takes one cycle to detect the conductive object 106. If the conductive object is on the $N^{th}$ metal strip 104(N), then the processing device 105 takes N cycles to detect the conductive object 106. Accordingly, the processing device 105 takes, on average, (N+1)/2 to locate the contacting point of the conductive object 106 with this linear searching algorithm.

In conventional touch-sensor pads using a PS/2 interface, the scan rate or speed at which the touch-sensor pad locates the position of the contact point of the conductive object on the touch-sensor pad is 30 milliseconds (ms) (e.g., to complete one scan). However, the minimum sample rate of PS/2 may be 10-12.5 ms. For example, in the stream mode of the PS/2 protocol, the user interface sends movement data when it detects movement or a change in state of one or more buttons. The maximum rate at which this data reporting may occur is known as the sample rate. This parameter ranges from 10 samples/sec to 200 samples/sec. The default value for the sample rate is 100 samples/sec and the host may change that value. Conventional computers will set the sample rate to 80 samples/sec or 100 samples/sec, resulting in minimum sampling times of 12.5 ms and 10 ms, respectively. Accordingly, a user will notice the position "jumps" in the cursor with scan speeds slower than the minimum sample rate. Further, the slower scan speed in the sample rate of the interface may bottleneck data communication between the user interface device and the host.

BRIEF DESCRIPTION OF THE DRAWINGS

The present invention is illustrated by way of example, and not by way of limitation, in the figures of the accompanying drawings.

FIG. 7B illustrates a block diagram of the switch circuit of FIG. 7A in a first setting.

FIG. 7C illustrates a block diagram of the switch circuit of FIG. 7A in a second setting.

DETAILED DESCRIPTION

Figure 1A:
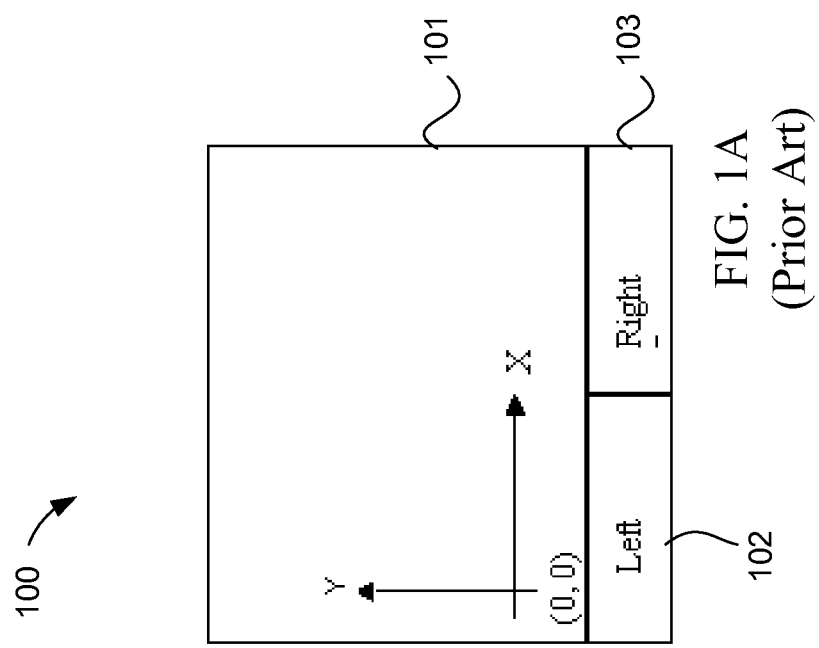
FIG. 1A illustrates a conventional touch-sensor pad.
Figure 1B:
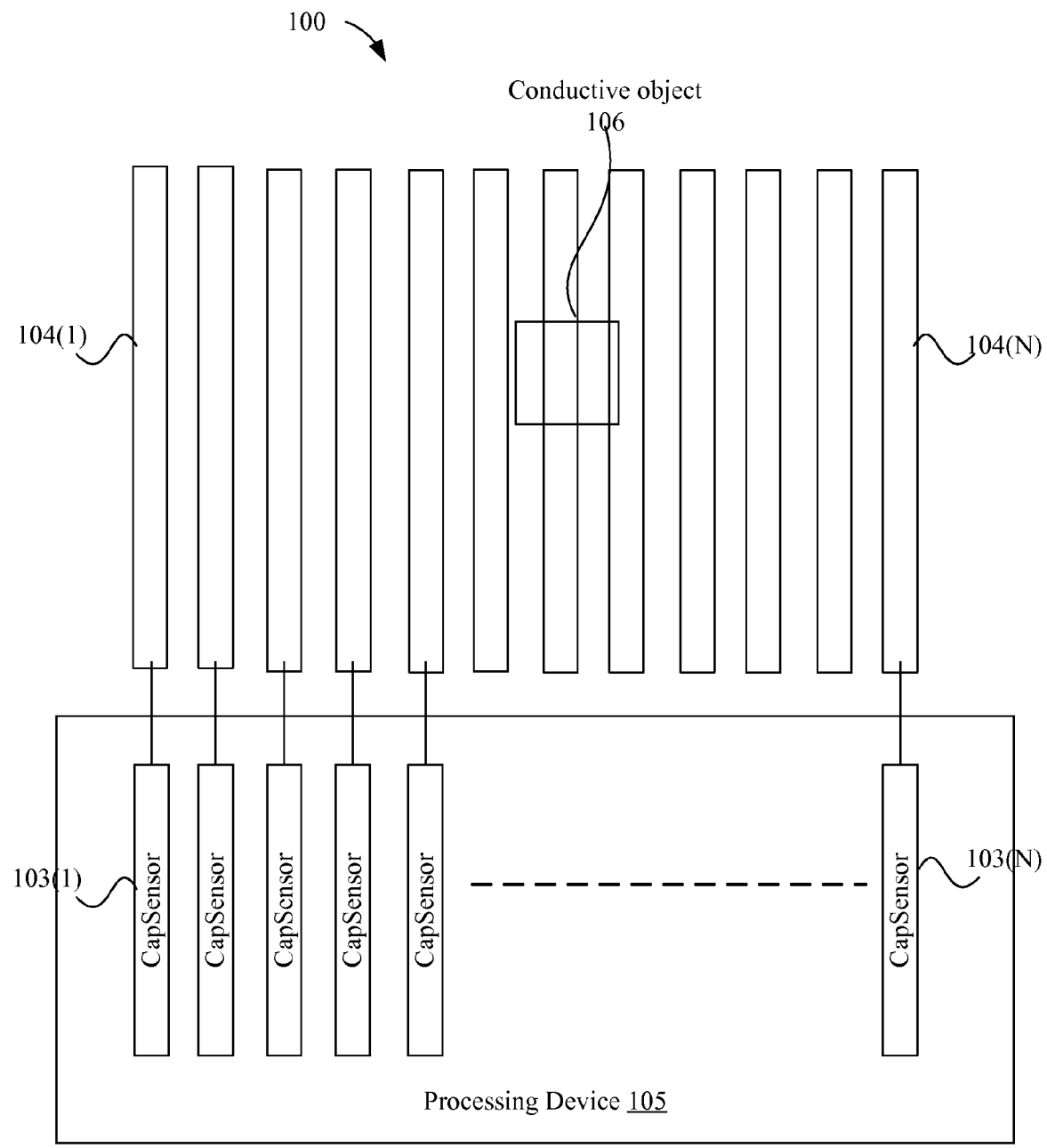
FIG. 1B illustrates a graph of the capacitance over time of the conventional touch-sensor pad described above.

Described herein is a method and apparatus for detecting the presence of the conductive object to determine a position of the conductive object using a first and second scans. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and apparatus are described to determine a position of a conductive object on a sensing device using first and second scans. In one embodiment, the method may include detecting a presence of a conductive object in a first area of a sensing device using a first scan of the sensing device, wherein the first area is less than an entire area of the sensing device, and detecting the presence of the conductive object to determine a position of the conductive object within the first area using a second scan of the first area of the sensing device. The first scan may include scanning two or more first scan groups of sensor elements during the first scan, where each group of sensor elements is separately scanned during the first scan. Each group includes two or more sensor elements coupled together during the first scan. Also, the first scan includes selecting a group of the two or more first scan groups that includes the first area in which the presence of the conductive object is detected. The second scan includes scanning two or more sensor elements of the selected group that includes the first area during the second scan. Each sensor element of the two or more sensor elements is separately scanned during the second scan. Also, the second scan includes selecting a sensor element of the two or more sensor elements of the selected group that includes the detected presence of the conductive object.

The apparatus may include a plurality of sensor elements to detect a presence of a conductive object on the sensing device, and a switch circuit coupled to the plurality of sensor elements. The switch circuit is configured to group the plurality of sensor elements into multiple first scan groups and a second scan group. The apparatus may also include a processing device coupled to the switch circuit. The processing device comprises one or more capacitance sensors coupled to the switch circuit to measure capacitance on the plurality of sensor elements.

The switch circuit includes two settings. The first setting of the switch circuit groups the n strips (e.g., sensor elements) into first scan groups (e.g., coarse scan groups). The sensor elements of each group are coupled together. By performing a coarse detection of the sensing device, one of the groups will be selected (e.g., for fine scan). In the second setting, all the capacitance sensors, previously coupled to the groups of combined strips, will be switched to be coupled to the strips (e.g., sensor elements) in this selected group (e.g., fine scan group). At this fine detecting phase, the exact strip (e.g., sensor element) being touched is located.

With this new approach, it may take, in average, $2\sqrt{N}$ cycles per scan, compared against $(N+1)/2$ cycles per scan with linear search algorithm.

The switch circuit, described herein, may also be configured to group the sensor elements (e.g., strips or pads) in two settings. One setting is used for a coarse scan to detect a presence of a conductive object in a first area that is smaller than the entire area of the entire sensing device. The second setting is used for a fine scan to detect the presence of the conductive object to determine a position of the conductive object within the first area detected in the first setting. The first setting is used during the first scan, and the second setting is used for the second scan. Using switch circuit to group the sensor elements at coarse and fine phase to elevate the scan rate to the performance level of binary search algorithm.

Figure 2:
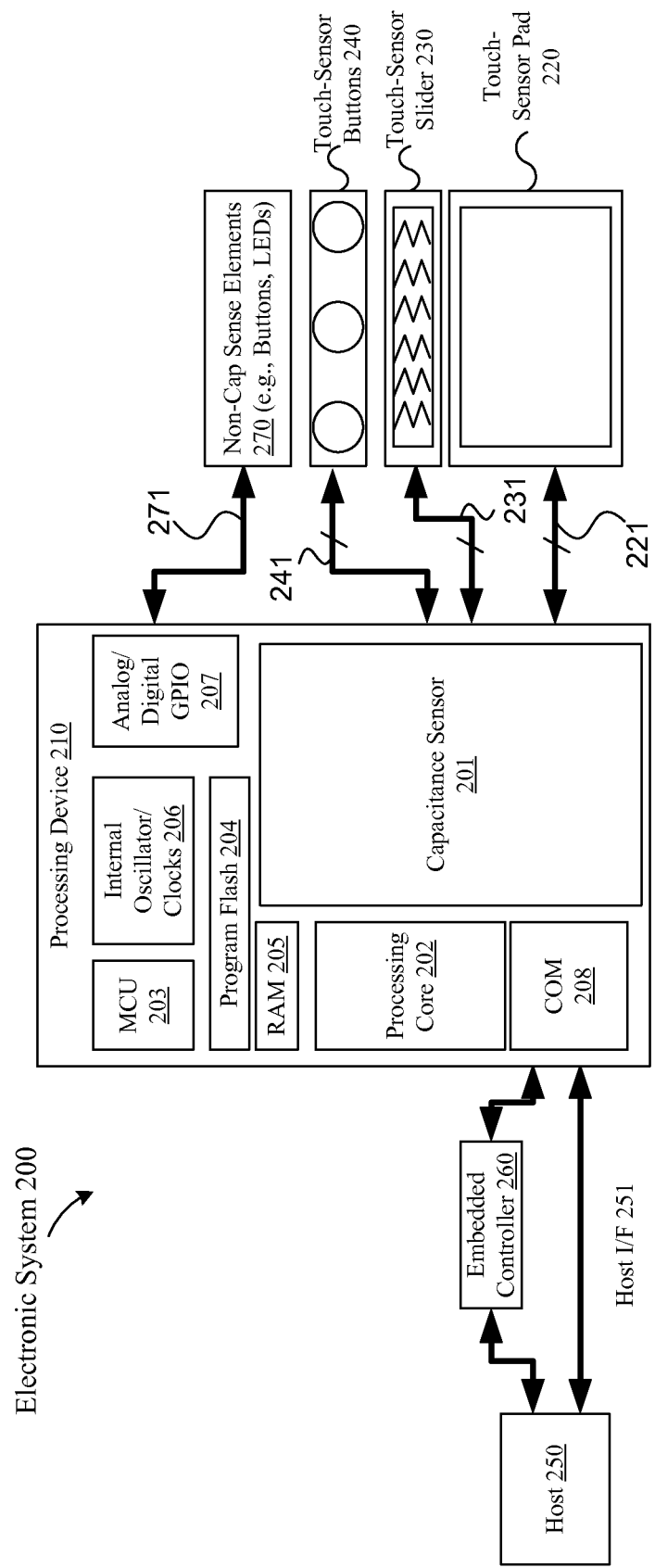
FIG. 2 illustrates a block diagram of one embodiment of an electronic system having a processing device for capacitive sensing.

FIG. 2 illustrates a block diagram of one embodiment of an electronic system having a processing device for recognizing a tap gesture. Electronic system 200 includes processing device 210, touch-sensor pad 220, touch-sensor 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems, etc.) using, in one embodiment, configurable user modules ("UMs"). The digital block array may be coupled to a system bus. Processing device 210 may also include memory, such as random access memory (RAM) 205 and program flash 204. RAM 205 may be static RAM (SRAM), and program flash 204 may be a non-volatile storage, which may be used to store firmware (e.g., control algorithms executable by processing core 202 to implement operations described herein). Processing device 210 may also include a memory controller unit (MCU) 203 coupled to memory and the processing core 202.

The processing device 210 may also include an analog block array (not illustrated). The analog block array is also coupled to the system bus. Analog block array also may be configured to implement a variety of analog circuits (e.g., ADC, analog filters, etc.) using configurable UMs. The analog block array may also be coupled to the GPIO 207.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 202 are described in more detail below.

It should be noted that the embodiments described herein are not limited to touch-sensor pads for notebook implementations, but can be used in other capacitive sensing implementations, for example, the sensing device may be a touch-slider 230, or a touch-sensor 240 (e.g., capacitance sensing button). Similarly, the operations described herein are not limited to notebook cursor operations, but can include other operations, such as lighting control (dimmer), volume control, graphic equalizer control, speed control, or other control operations requiring gradual adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition and numeric keypad operation.

In one embodiment, the electronic system 200 includes a touch-sensor pad 220 coupled to the processing device 210 via bus 221. Touch-sensor pad 220 may include a multi-dimension sensor array. The multi-dimension sensor array comprises a plurality of sensor elements, organized as rows and columns. In another embodiment, the electronic system 200 includes a touch-sensor slider 230 coupled to the processing device 210 via bus 231. Touch-sensor slider 230 may include a single-dimension sensor array. The single-dimension sensor array comprises a plurality of sensor elements, organized as rows, or alternatively, as columns. In another embodiment, the electronic system 200 includes a touch-sensor button 240 coupled to the processing device 210 via bus 241. Touch-sensor button 240 may include a single-dimension or multi-dimension sensor array. The single- or multi-dimension sensor array comprises a plurality of sensor elements. For a touch-sensor button, the plurality of sensor elements may be coupled together to detect a presence of a conductive object over the entire surface of the sensing device. Capacitance sensor elements may be used as non-contact switches. These switches, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 may also include non-capacitance sensor elements 270 coupled to the processing device 210 via bus 271. The non-capacitance sensor elements 270 may include buttons, light emitting diodes (LEDs), and other user interface devices, such as a mouse, a keyboard, or other functional keys that do not require capacitance sensing. In one embodiment, buses 271, 241, 231, and 221 may be a single bus. Alternatively, these buses may be configured into any combination of one or more separate buses.

The processing device may also provide value-add functionality such as keyboard control integration, LEDs, battery charger and general purpose I/O, as illustrated as non-capacitance sensor elements 270. Non-capacitance sensor elements 270 are coupled to the GPIO 207.

Processing device 210 may include internal oscillator/clocks 206, and communication block 208. The oscillator/clocks block 206 provides clock signals to one or more of the components of processing device 210. Communication block 208 may be used to communicate with an external component, such as a host processor 250, via host interface (I/F) line 251. Alternatively, processing block 210 may also be coupled to embedded controller 260 to communicate with the external components, such as host 250. Interfacing to the host 205 can be through various methods. In one exemplary embodiment, interfacing with the host 250 may be done using a standard PS/2 interface to connect to an embedded controller 260, which in turn sends data to the host 250 via low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing may be done using a universal serial bus (USB) interface directly coupled to the host 250 via host interface line 251. Alternatively, the processing device 210 may communicate to external components, such as the host 250 using industry standard interfaces, such as USB, PS/2, inter-integrated circuit (I2C) bus, or system packet interface (SPI). The embedded controller 260 and/or embedded controller 260 may be coupled to the processing device 210 with a ribbon or flex cable from an assembly, which houses the touch-sensor pad and processing device.

In one embodiment, the processing device 210 is configured to communicate with the embedded controller 260 or the host 250 to send data. The data may be a command or alternatively a signal. In an exemplary embodiment, the electronic system 200 may operate in both standard-mouse compatible and enhanced modes. The standard-mouse compatible mode utilizes the HID class drivers already built into the Operating System (OS) software of host 250. These drivers enable the processing device 210 and sensing device to operate as a standard cursor control user interface device, such as a two-button PS/2 mouse. The enhanced mode may enable additional features such as scrolling (reporting absolute position) or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In other words, the processing device 210 may operate to communicate data (e.g., via commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the cursor, scroll-up, scroll-down, scroll-left, scroll-right, step Back, and step Forward. Alternatively, other user interface device commands may be communicated to the host 250 from the processing device 210. These commands may be based on gestures occurring on the sensing device that are recognized by the processing device, such as tap, push, hop, and zigzag gestures. Alternatively, other commands may be recognized. Similarly, signals may be sent that indicate the recognition of these operations.

In particular, a tap gesture, for example, may be when the finger (e.g., conductive object) is on the sensing device for less than a threshold time. If the time the finger is placed on the touchpad is greater than the threshold time it may be considered to be a movement of the cursor, in the x- or y-axes. Scroll-up, scroll-down, scroll-left, and scroll-right, step back, and step-forward may be detected when the absolute position of the conductive object is within a pre-defined area, and movement of the conductive object is detected.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 may be a Programmable System on a Chip (PSoC™) processing device, manufactured by Cypress Semiconductor Corporation, San Jose, Calif. Alternatively, processing device 210 may be other one or more processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s).

Capacitance sensor 201 may be integrated into the IC of the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above.

In one embodiment, electronic system 200 may be used in a notebook computer. Alternatively, the electronic device may be used in other applications, such as a mobile handset, a personal data assistant (PDA), a keyboard, a television, a remote control, a monitor, a handheld multi-media device, a handheld video player, a handheld gaming device, or a control panel.

In one embodiment, capacitance sensor 201 may be a capacitive switch relaxation oscillator (CSR). The CSR may have an array of capacitive touch switches using a current-programmable relaxation oscillator, an analog multiplexer, digital counting functions, and high-level software routines to compensate for environmental and physical switch variations. The switch array may include combinations of independent switches, sliding switches (e.g., touch-sensor slider), and touch-sensor pads implemented as a pair of orthogonal sliding switches. The CSR may include physical, electrical, and software components. The physical component may include the physical switch itself, typically a pattern constructed on a printed circuit board (PCB) with an insulating cover, a flexible membrane, or a transparent overlay. The electrical component may include an oscillator or other means to convert a changed capacitance into a measured signal. The electrical component may also include a counter or timer to measure the oscillator output. The software component may include detection and compensation software algorithms to convert the count value into a switch detection decision. For example, in the case of slide switches or X-Y touch-sensor pads, a calculation for finding position of the conductive object to greater resolution than the physical pitch of the switches may be used.

It should be noted that there are various known methods for measuring capacitance. Although the embodiments described herein are described using a relaxation oscillator, the present embodiments are not limited to using relaxation oscillators, but may include other methods, such as current versus voltage phase shift measurement, resistor-capacitor charge timing, capacitive bridge divider or, charge transfer.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitor values may require very large resistors for reasonable timing. The capacitive bridge divider may include driving the capacitor under test through a fixed reference capacitor. The reference capacitor and the capacitor under test form a voltage divider. The voltage signal is recovered with a synchronous demodulator, which may be done in the processing device 210. The charge transfer may be conceptually similar to an R-C charging circuit. In this method, $C_P$ is the capacitance being sensed. $C_{SUM}$ is the summing capacitor, into which charge is transferred on successive cycles. At the start of the measurement cycle, the voltage on $C_{SUM}$ is reset. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 3A:
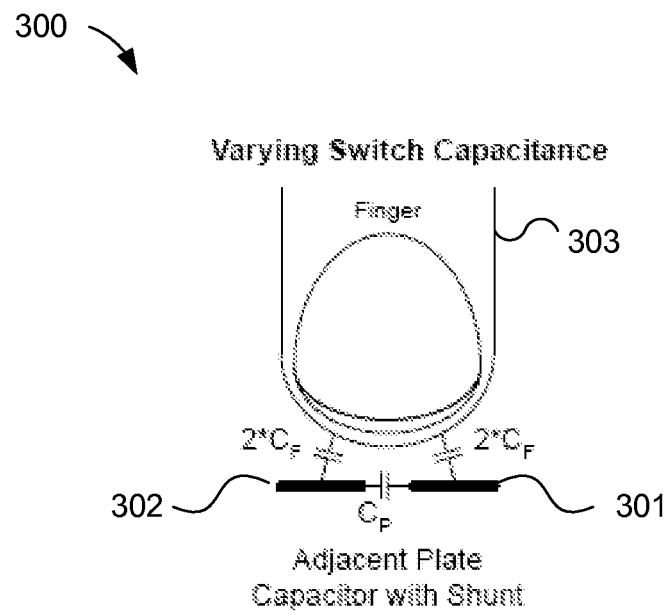
FIG. 3A illustrates a varying switch capacitance.
Figure 3B:
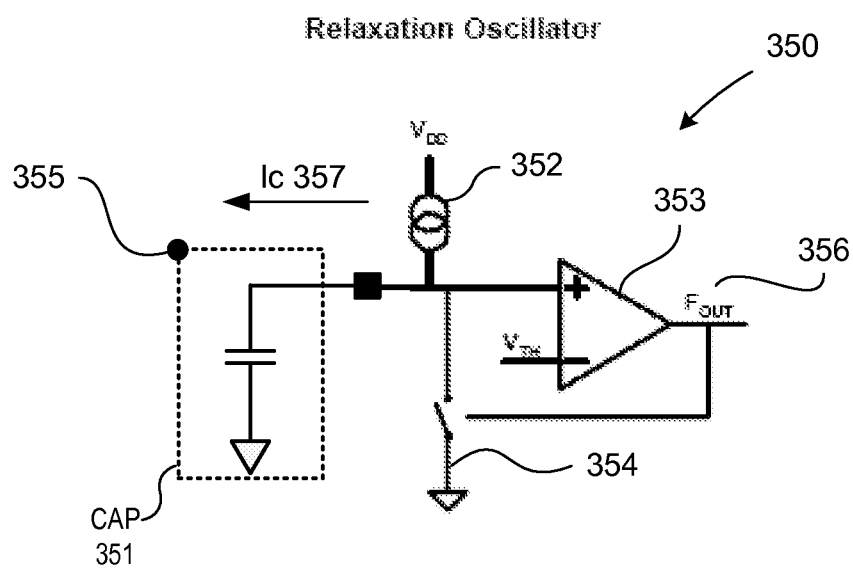
FIG. 3B illustrates one embodiment of a relaxation oscillator.

FIG. 3A illustrates a varying switch capacitance. In its basic form, a capacitive switch 300 is a pair of adjacent plates 301 and 302. There is a small edge-to-edge capacitance Cp, but the intent of switch layout is to minimize the base capacitance Cp between these plates. When a conductive object 303 (e.g., finger) is placed in proximity to the two plate 301 and 302, there is a capacitance 2*Cf between one electrode 301 and the conductive object 303 and a similar capacitance 2*Cf between the conductive object 303 and the other electrode 302. The capacitance between one electrode 301 and the conductive object 303 and back to the other electrode 302 adds in parallel to the base capacitance Cp between the plates 301 and 302, resulting in a change of capacitance Cf. Capacitive switch 300 may be used in a capacitance switch array. The capacitance switch array is a set of capacitors where one side of each is grounded. Thus, the active capacitor (as represented in FIG. 3B as capacitor 351) has only one accessible side. The presence of the conductive object 303 increases the capacitance (Cp+Cf) of the switch 300 to ground. Determining switch activation is then a matter of measuring change in the capacitance (Cf). Switch 300 is also known as a grounded variable capacitor. In one exemplary embodiment, Cf may range from approximately 10-30 picofarads (pF). Alternatively, other ranges may be used.

The conductive object in this case is a finger, alternatively, this technique may be applied to any conductive object, for example, a conductive door switch, position sensor, or conductive pen in a stylus tracking system.

FIG. 3B illustrates one embodiment of a relaxation oscillator. The relaxation oscillator 350 is formed by the capacitance to be measured on capacitor 351, a charging current source 352, a comparator 353, and a reset switch 354. It should be noted that capacitor 351 is representative of the capacitance measured on a sensor element of a sensor array. The relaxation oscillator is coupled to drive a charging current (Ic) 357 in a single direction onto a device under test ("DUT") capacitor, capacitor 351. As the charging current piles charge onto the capacitor 351, the voltage across the capacitor increases with time as a function of Ic 357 and its capacitance C. Equation (1) describes the relation between current, capacitance, voltage and time for a charging capacitor.

$$CdV = I_c dt \quad (1)$$

The relaxation oscillator begins by charging the capacitor 351 from a ground potential or zero voltage and continues to pile charge on the capacitor 351 at a fixed charging current Ic 357 until the voltage across the capacitor 351 at node 355 reaches a reference voltage or threshold voltage, $V_{TH}$ 355. At $V_{TH}$ 355, the relaxation oscillator allows the accumulated charge at node 355 to discharge (e.g., the capacitor 351 to "relax" back to the ground potential) and then the process repeats itself. In particular, the output of comparator 353 asserts a clock signal $F_{OUT}$ 356 (e.g., $F_{OUT}$ 356 goes high), which enables the reset switch 354. This resets the voltage on the capacitor at node 355 to ground and the charge cycle starts again. The relaxation oscillator outputs a relaxation oscillator clock signal ($F_{OUT}$ 356) having a frequency ($f_{RO}$) dependent upon capacitance C of the capacitor 351 and charging current Ic 357.

The comparator trip time of the comparator 353 and reset switch 354 add a fixed delay. The output of the comparator 353 is synchronized with a reference system clock to guarantee that the comparator reset time is long enough to completely reset the charging voltage on capacitor 355. This sets a practical upper limit to the operating frequency. For example, if capacitance C of the capacitor 351 changes, then $f_{RO}$ will change proportionally according to Equation (1). By comparing $f_{RO}$ of $F_{OUT}$ 356 against the frequency ($f_{REF}$) of a known reference system clock signal (REF CLK), the change in capacitance ΔC can be measured. Accordingly, equations (2) and (3) below describe that a change in frequency between $F_{OUT}$ 356 and REF CLK is proportional to a change in capacitance of the capacitor 351.

$$\Delta C \propto \Delta f, \text{ where} \quad (2)$$

$$\Delta f = f_{RO} - f_{REF}. \quad (3)$$

In one embodiment, a frequency comparator may be coupled to receive relaxation oscillator clock signal ($F_{OUT}$ 356) and REF CLK, compare their frequencies $f_{RO}$ and $f_{REF}$, respectively, and output a signal indicative of the difference Δf between these frequencies. By monitoring Δf one can determine whether the capacitance of the capacitor 351 has changed.

In one exemplary embodiment, the relaxation oscillator 350 may be built using a 555 timer to implement the comparator 353 and reset switch 354. Alternatively, the relaxation oscillator 350 may be built using other circuiting. Relaxation oscillators are known in by those of ordinary skill in the art, and accordingly, additional details regarding their operation have not been included so as to not obscure the present embodiments.

Figure 4:
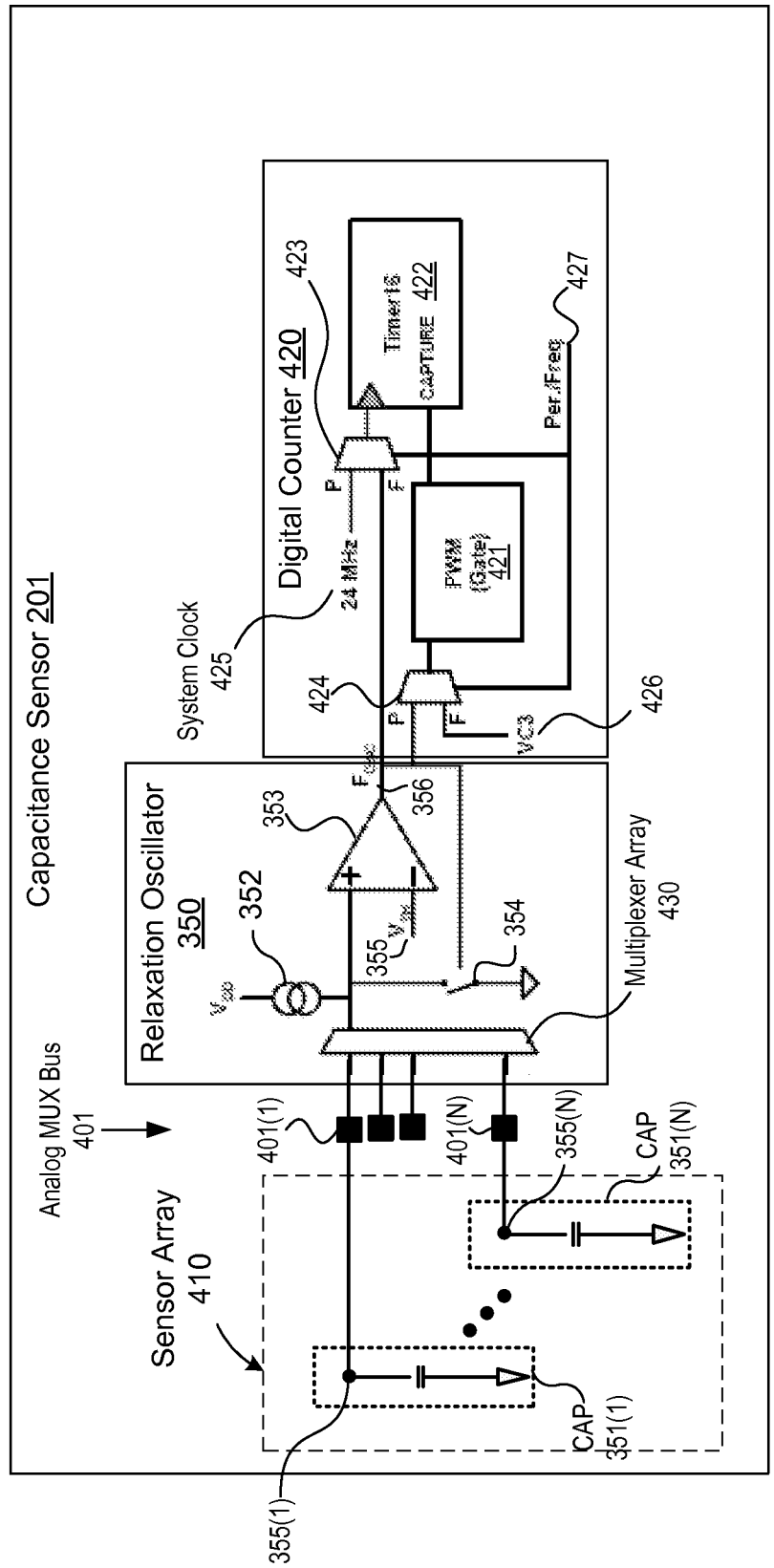
FIG. 4 illustrates a block diagram of one embodiment of a capacitance sensor including a relaxation oscillator and digital counter.

FIG. 4 illustrates a block diagram of one embodiment of a capacitance sensor including a relaxation oscillator and digital counter. Capacitance sensor 201 of FIG. 4 includes a sensor array 410 (also known as a switch array), relaxation oscillator 350, and a digital counter 420. Sensor array 410 includes a plurality of sensor elements 355(1)-355(N), where N is a positive integer value that represents the number of rows (or alternatively columns) of the sensor array 410. Each sensor element is represented as a capacitor, as previously described with respect to FIG. 3B. The sensor array 410 is coupled to relaxation oscillator 350 via an analog bus 401 having a plurality of pins 401(1)-401(N). In one embodiment, the sensor array 410 may be a single-dimension sensor array including the sensor elements 355(1)-355(N), where N is a positive integer value that represents the number of sensor elements of the single-dimension sensor array. The single-dimension sensor array 410 provides output data to the analog bus 401 of the processing device 210 (e.g., via lines 231). Alternatively, the sensor array 410 may be a multi-dimension sensor array including the sensor elements 355(1)-355(N), where N is a positive integer value that represents the number of sensor elements of the multi-dimension sensor array. The multi-dimension sensor array 410 provides output data to the analog bus 401 of the processing device 210 (e.g., via bus 221).

Relaxation oscillator 350 of FIG. 4 includes all the components described with respect to FIG. 3B, and a selection circuit 430. The selection circuit 430 is coupled to the plurality of sensor elements 355(1)-355(N), the reset switch 354, the current source 352, and the comparator 353. Selection circuit 430 may be used to allow the relaxation oscillator 350 to measure capacitance on multiple sensor elements (e.g., rows or columns). The selection circuit 430 may be configured to sequentially select a sensor element of the plurality of sensor elements to provide the charge current and to measure the capacitance of each sensor element. In one exemplary embodiment, the selection circuit 430 is a multiplexer array of the relaxation oscillator 350. Alternatively, selection circuit may be other circuitry outside the relaxation oscillator 350, or even outside the capacitance sensor 201 to select the sensor element to be measured. Capacitance sensor 201 may include one relaxation oscillator and digital counter for the plurality of sensor elements of the sensor array. Alternatively, capacitance sensor 201 may include multiple relaxation oscillators and digital counters to measure capacitance on the plurality of sensor elements of the sensor array. The multiplexer array may also be used to ground the sensor elements that are not being measured. This may be done in conjunction with a dedicated pin in the GP10 port 207.

In another embodiment, the capacitance sensor 201 may be configured to simultaneously scan the sensor elements, as opposed to being configured to sequentially scan the sensor elements as described above. For example, the sensing device may include a sensor array having a plurality of rows and columns. The rows may be scanned simultaneously, and the columns may be scanned simultaneously.

In one exemplary embodiment, the voltages on all of the rows of the sensor array are simultaneously moved, while the voltages of the columns are held at a constant voltage, with the complete set of sampled points simultaneously giving a profile of the conductive object in a first dimension. Next, the voltages on all of the rows are held at a constant voltage, while the voltages on all the rows are simultaneously moved, to obtain a complete set of sampled points simultaneously giving a profile of the conductive object in the other dimension.

In another exemplary embodiment, the voltages on all of the rows of the sensor array are simultaneously moved in a positive direction, while the voltages of the columns are moved in a negative direction. Next, the voltages on all of the rows of the sensor array are simultaneously moved in a negative direction, while the voltages of the columns are moved in a positive direction. This technique doubles the effect of any transcapacitance between the two dimensions, or conversely, halves the effect of any parasitic capacitance to the ground. In both methods, the capacitive information from the sensing process provides a profile of the presence of the conductive object to the sensing device in each dimension. Alternatively, other methods for scanning known by those of ordinary skill in the art may be used to scan the sensing device.

Digital counter 420 is coupled to the output of the relaxation oscillator 350. Digital counter 420 receives the relaxation oscillator output signal 356 ($F_{OUT}$). Digital counter 420 is configured to count at least one of a frequency or a period of the relaxation oscillator output received from the relaxation oscillator.

As previously described with respect to the relaxation oscillator 350, when a finger or conductive object is placed on the switch, the capacitance increases from Cp to Cp+Cf so the relaxation oscillator output signal 356 ($F_{OUT}$) decreases. The relaxation oscillator output signal 356 ($F_{OUT}$) is fed to the digital counter 420 for measurement. There are two methods for counting the relaxation oscillator output signal 356, frequency measurement and period measurement. In one embodiment, the digital counter 420 may include two multiplexers 423 and 424. Multiplexers 423 and 424 are configured to select the inputs for the PWM 421 and the timer 422 for the two measurement methods, frequency and period measurement methods. Alternatively, other selection circuits may be used to select the inputs for the PWM 421 and the time 422. In another embodiment, multiplexers 423 and 424 are not included in the digital counter, for example, the digital counter 420 may be configured in one, or the other, measurement configuration.

In the frequency measurement method, the relaxation oscillator output signal 356 is counted for a fixed period of time. The counter 422 is read to obtain the number of counts during the gate time. This method works well at low frequencies where the oscillator reset time is small compared to the oscillator period. A pulse width modulator (PWM) 441 is clocked for a fixed period by a derivative of the system clock, VC3 426 (which is a divider from the 24 MHz system clock 425). Pulse width modulation is a modulation technique that generates variable-length pulses to represent the amplitude of an analog input signal; in this case VC3 426. The output of PWM 421 enables timer 422 (e.g., 16-bit). The relaxation oscillator output signal 356 clocks the timer 422. The timer 422 is reset at the start of the sequence, and the count value is read out at the end of the gate period.

In the period measurement method, the relaxation oscillator output signal 356 gates a counter 422, which is clocked by the system clock 425 (e.g., 24 MHz). In order to improve sensitivity and resolution, multiple periods of the oscillator are counted with the PWM 421. The output of PWM 421 is used to gate the timer 422. In this method, the relaxation oscillator output signal 356 drives the clock input of PWM 421. As previously described, pulse width modulation is a modulation technique that generates variable-length pulses to represent the amplitude of an analog input signal; in this case the relaxation oscillator output signal 356. The output of the PWM 421 enables a timer 422 (e.g., 16-bit), which is clocked at the system clock frequency 425 (e.g., 24 MHz). When the output of PWM 421 is asserted (e.g., goes high), the count starts by releasing the capture control. When the terminal count of the PWM 421 is reached, the capture signal is asserted (e.g., goes high), stopping the count and setting the PWM's interrupt. The timer value is read in this interrupt. The relaxation oscillator 350 is indexed to the next switch (e.g., capacitor 351(2)) to be measured and the count sequence is started again.

The two counting methods may have equivalent performance in sensitivity and signal-to-noise ratio (SNR). The period measurement method may have a slightly faster data acquisition rate, but this rate is dependent on software load and the values of the switch capacitances. The frequency measurement method has a fixed-switch data acquisition rate.

The length of the counter 422 and the detection time required for the switch are determined by sensitivity requirements. Small changes in the capacitance on capacitor 351 result in small changes in frequency. In order to find these small changes, it may be necessary to count for a considerable time.

At startup (or boot) the switches (e.g., capacitors 351(1)-(N)) are scanned and the count values for each switch with no actuation are stored as a baseline array (Cp). The presence of a finger on the switch is determined by the difference in counts between a stored value for no switch actuation and the acquired value with switch actuation, referred to here as Δn. The sensitivity of a single switch is approximately:

$$\frac{\Delta n}{n} = \frac{Cf}{Cp} \quad (4)$$

The value of Δn should be large enough for reasonable resolution and clear indication of switch actuation. This drives switch construction decisions.

Cf should be as large a fraction of Cp as possible. In one exemplary embodiment, the fraction of Cf/Cp ranges between approximately 0.01 to approximately 2.0. Alternatively, other fractions may be used for Cf/Cp. Since Cf is determined by finger area and distance from the finger to the switch's conductive traces (through the over-lying insulator), the baseline capacitance Cp should be minimized. The baseline capacitance Cp includes the capacitance of the switch pad plus any parasitics, including routing and chip pin capacitance.

In switch array applications, variations in sensitivity should be minimized. If there are large differences in Δn, one switch may actuate at 1.0 cm, while another may not actuate until direct contact. This presents a non-ideal user interface device. There are numerous methods for balancing the sensitivity. These may include precisely matching on-board capacitance with PC trace length modification, adding balance capacitors on each switch's PC board trace, and/or adapting a calibration factor to each switch to be applied each time the switch is tested.

In one embodiment, the PCB design may be adapted to minimize capacitance, including thicker PCBs where possible. In one exemplary embodiment, a 0.062 inch thick PCB is used. Alternatively, other thicknesses may be used, for example, a 0.015 inch thick PCB.

It should be noted that the count window should be long enough for Δn to be a "significant number." In one embodiment, the "significant number" can be as little as 10, or alternatively, as much as several hundred. In one exemplary embodiment, where Cf is 1.0% of Cp (a typical "weak" switch), and where the switch threshold is set at a count value of 20, n is found to be:

$$n = \Delta n \cdot \frac{Cf}{Cp} = 2000 \quad (5)$$

Adding some margin to yield 2500 counts, and running the frequency measurement method at 1.0 MHz, the detection time for the switch is 4 microseconds. In the frequency measurement method, the frequency difference between a switch with and without actuation (i.e., CP+CF vs. CP) is approximately:

$$\Delta n = \frac{t_{count} \cdot i_c}{V_{TH}} \frac{Cf}{Cp^2} \tag{6}$$

This shows that the sensitivity variation between one channel and another is a function of the square of the difference in the two channels' static capacitances. This sensitivity difference can be compensated using routines in the high-level Application Programming Interfaces (APIs).

In the period measurement method, the count difference between a switch with and without actuation (i.e., CP+CF vs. CP) is approximately:

$$\Delta n = N_{Periods} \cdot \frac{Cf \cdot V_{TH}}{i_C} \cdot f_{SysClk} \tag{7}$$

The charge currents are typically lower and the period is longer to increase sensitivity, or the number of periods for which $f_{SysClk}$ is counted can be increased. In either method, by matching the static (parasitic) capacitances Cp of the individual switches, the repeatability of detection increases, making all switches work at the same difference. Compensation for this variation can be done in software at runtime. The compensation algorithms for both the frequency method and period method may be included in the high-level APIs.

Some implementations of this circuit use a current source programmed by a fixed-resistor value. If the range of capacitance to be measured changes, external components, (i.e., the resistor) should be adjusted.

Using the multiplexer array 430, multiple sensor elements may be sequentially scanned to provide current to and measure the capacitance from the capacitors (e.g., sensor elements), as previously described. In other words, while one sensor element is being measured, the remaining sensor elements are grounded using the GPIO port 207. This drive and multiplex arrangement bypasses the existing GPIO to connect the selected pin to an internal analog multiplexer (mux) bus. The capacitor charging current (e.g., current source 352) and reset switch 353 are connected to the analog mux bus. This may limit the pin-count requirement to simply the number of switches (e.g., capacitors 351(1)-351(N)) to be addressed. In one exemplary embodiment, no external resistors or capacitors are required inside or outside the processing device 210 to enable operation.

The capacitor charging current for the relaxation oscillator 350 is generated in a register programmable current output DAC (also known as IDAC). Accordingly, the current source 352 is a current DAC or IDAC. The IDAC output current may be set by an 8-bit value provided by the processing device 210, such as from the processing core 202. The 8-bit value may be stored in a register or in memory.

Estimating and measuring PCB capacitances may be difficult; the oscillator-reset time may add to the oscillator period (especially at higher frequencies); and there may be some variation to the magnitude of the IDAC output current with operating frequency. Accordingly, the optimum oscillation frequency and operating current for a particular switch array may be determined to some degree by experimentation.

In many capacitive switch designs the two "plates" (e.g., 301 and 302) of the sensing capacitor are actually adjacent PCB pads or traces, as indicated in FIG. 3A. Typically, one of these plates is grounded. Layouts for touch-sensor slider (e.g., linear slide switches) and touch-sensor pad applications have switches that are immediately adjacent. In this case, all of the switches that are not active are grounded through the GPIO 207 of the processing device 210 dedicated to that pin. The actual capacitance between adjacent plates is small (Cp), but the capacitance of the active plate (and its PCB trace back to the processing device 210) to ground, when detecting the presence of the conductive object 303, may be considerably higher (Cp+Cf). The capacitance of two parallel plates is given by the following equation:

$$C = \varepsilon_0 \cdot \varepsilon_R \cdot \frac{A}{d} = \varepsilon_R \cdot 8.85 \cdot \frac{A}{d} \text{ pF/m} \tag{8}$$

The dimensions of equation (8) are in meters. This is a very simple model of the capacitance. The reality is that there are fringing effects that substantially increase the switch-to-ground (and PCB trace-to-ground) capacitance.

Switch sensitivity (i.e., actuation distance) may be increased by one or more of the following: 1) increasing board thickness to increase the distance between the active switch and any parasitics; 2) minimizing PC trace routing underneath switches; 3) utilizing a grided ground with 50% or less fill if use of a ground plane is absolutely necessary; 4) increasing the spacing between switch pads and any adjacent ground plane; 5) increasing pad area; 6) decreasing thickness of any insulating overlay; or 7) verifying that there is no air-gap between the PC pad surface and the touching finger.

There is some variation of switch sensitivity as a result of environmental factors. A baseline update routine, which compensates for this variation, may be provided in the high-level APIs.

Sliding switches are used for control requiring gradual adjustments. Examples include a lighting control (dimmer), volume control, graphic equalizer, and speed control. These switches are mechanically adjacent to one another. Actuation of one switch results in partial actuation of physically adjacent switches. The actual position in the sliding switch is found by computing the centroid location of the set of switches activated.

In applications for touch-sensor sliders (e.g., sliding switches) and touch-sensor pads it is often necessary to determine finger (or other capacitive object) position to more resolution than the native pitch of the individual switches. The contact area of a finger on a sliding switch or a touch-pad is often larger than any single switch. In one embodiment, in order to calculate the interpolated position using a centroid, the array is first scanned to verify that a given switch location is valid. The requirement is for some number of adjacent switch signals to be above a noise threshold. When the strongest signal is found, this signal and those immediately adjacent are used to compute a centroid:

$$\text{Centroid} = \frac{n_{i-1} \cdot (i-1) + n_i i + n_{i+1} \cdot (i+1)}{n_{i-1} + n_i i + n_{i+1}} \tag{9}$$

The calculated value will almost certainly be fractional. In order to report the centroid to a specific resolution, for example a range of 0 to 100 for 12 switches, the centroid value may be multiplied by a calculated scalar. It may be more efficient to combine the interpolation and scaling operations into a single calculation and report this result directly in the desired scale. This may be handled in the high-level APIs. Alternatively, other methods may be used to interpolate the position of the conductive object.

A physical touchpad assembly is a multi-layered module to detect a conductive object. In one embodiment, the multi-layer stack-up of a touchpad assembly includes a PCB, an adhesive layer, and an overlay. The PCB includes the processing device 210 and other components, such as the connector to the host 250, necessary for operations for sensing the capacitance. These components are on the non-sensing side of the PCB. The PCB also includes the sensor array on the opposite side, the sensing side of the PCB. Alternatively, other multi-layer stack-ups may be used in the touchpad assembly.

The PCB may be made of standard materials, such as FR4 or Kapton™ (e.g., flexible PCB). In either case, the processing device 210 may be attached (e.g., soldered) directly to the sensing PCB (e.g., attached to the non-sensing side of the PCB). The PCB thickness varies depending on multiple variables, including height restrictions and sensitivity requirements. In one embodiment, the PCB thickness is at least approximately 0.3 millimeters (mm). Alternatively, the PCB may have other thicknesses. It should be noted that thicker PCBs may yield better results. The PCB length and width is dependent on individual design requirements for the device on which the sensing device is mounted, such as a notebook or mobile handset.

The adhesive layer is directly on top of the PCB sensing array and is used to affix the overlay to the overall touchpad assembly. Typical material used for connecting the overlay to the PCB is non-conductive adhesive such as 3M 467 or 468. In one exemplary embodiment, the adhesive thickness is approximately 0.05 mm. Alternatively, other thicknesses may be used.

The overlay may be non-conductive material used to protect the PCB circuitry to environmental elements and to insulate the user's finger (e.g., conductive object) from the circuitry. Overlay can be ABS plastic, polycarbonate, glass, or Mylar™ Alternatively, other materials known by those of ordinary skill in the art may be used. In one exemplary embodiment, the overlay has a thickness of approximately 1.0 mm. In another exemplary embodiment, the overlay thickness has a thickness of approximately 2.0 mm. Alternatively, other thicknesses may be used.

The sensor array may be a grid-like pattern of sensor elements (e.g., capacitive elements) used in conjunction with the processing device 210 to detect a presence of a conductive object, such as finger, to a resolution greater than that which is native. The touch-sensor pad layout pattern maximizes the area covered by conductive material, such as copper, in relation to spaces necessary to define the rows and columns of the sensor array.

Figure 5A:
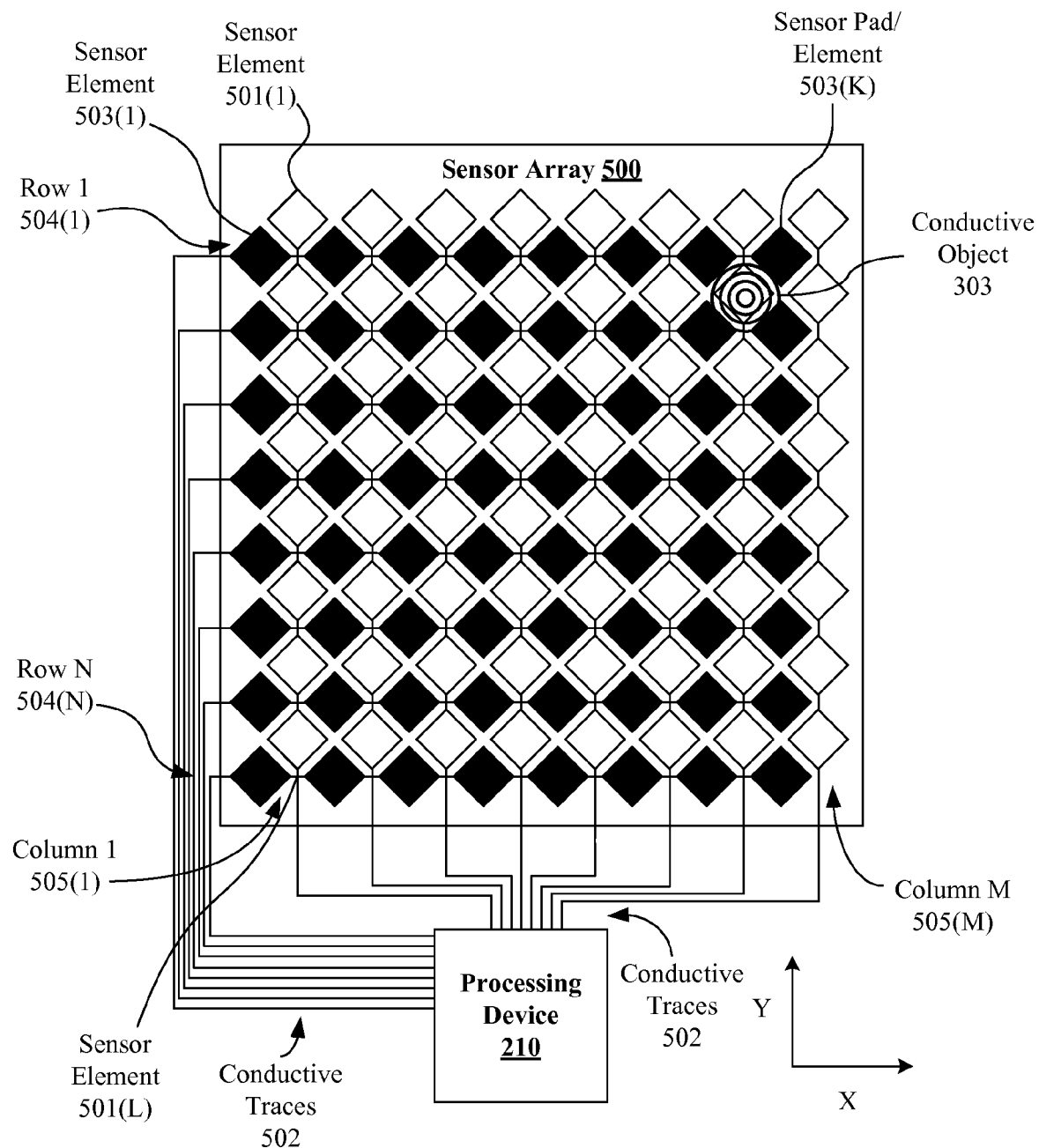
FIG. 5A illustrates a top-side view of one embodiment of a sensor array having a plurality of sensor elements for detecting a presence of a conductive object on the sensor array of a touch-sensor pad.

FIG. 5A illustrates a top-side view of one embodiment of a sensor array having a plurality of sensor elements for detecting a presence of a conductive object 303 on the sensor array 500 of a touch-sensor pad. Touch-sensor pad 220 includes a sensor array 500. Sensor array 500 includes a plurality of rows 504(1)-504(N) and a plurality of columns 505(1)-505(M), where N is a positive integer value representative of the number of rows and M is a positive integer value representative of the number of columns. Each row includes a plurality of sensor elements 503(1)-503(K), where K is a positive integer value representative of the number of sensor elements in the row. Each column includes a plurality of sensor elements 501(1)-501(L), where L is a positive integer value representative of the number of sensor elements in the column. Accordingly, sensor array is an N×M sensor matrix. The N×M sensor matrix, in conjunction with the processing device 210, is configured to detect a position of a presence of the conductive object 303 in the x-, and y-directions.

Figure 5B:
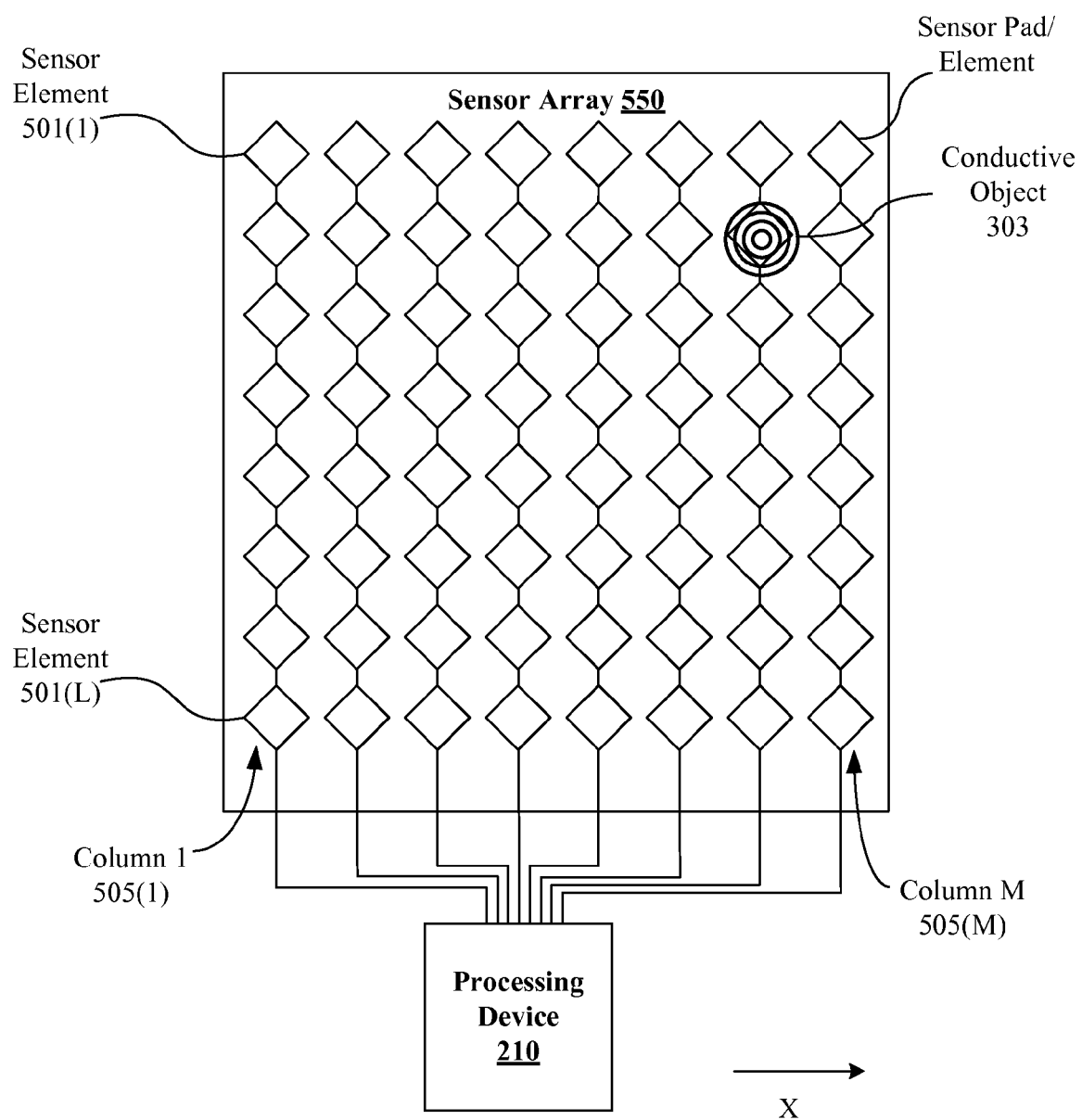
FIG. 5B illustrates a top-side view of one embodiment of a sensor array having a plurality of sensor elements for detecting a presence of a conductive object on the sensor array of a touch-sensor slider

FIG. 5B illustrates a top-side view of one embodiment of a sensor array having a plurality of sensor elements for detecting a presence of a conductive object 303 on the sensor array 550 of a touch-sensor slider. Touch-sensor slider 230 includes a sensor array 550. Sensor array 550 includes a plurality of columns 504(1)-504(M), where M is a positive integer value representative of the number of columns. Each column includes a plurality of sensor elements 501(1)-501(L), where L is a positive integer value representative of the number of sensor elements in the column. Accordingly, sensor array is a 1×M sensor matrix. The 1×M sensor matrix, in conjunction with the processing device 210, is configured to detect a position of a presence of the conductive object 303 in the x-direction. It should be noted that sensor array 500 may be configured to function as a touch-sensor slider 230.

Alternating columns in FIG. 5A correspond to x- and y-axis elements. The y-axis sensor elements 503(1)-503(K) are illustrated as black diamonds in FIG. 5A, and the x-axis sensor elements 501(1)-501(L) are illustrated as white diamonds in FIG. 5A and FIG. 5B. It should be noted that other shapes may be used for the sensor elements. In another embodiment, the columns and row may include vertical and horizontal bars (e.g., rectangular shaped bars), however, this design may include additional layers in the PCB to allow the vertical and horizontal bars to be positioned on the PCB so that they are not in contact with one another.

Figure 5C:
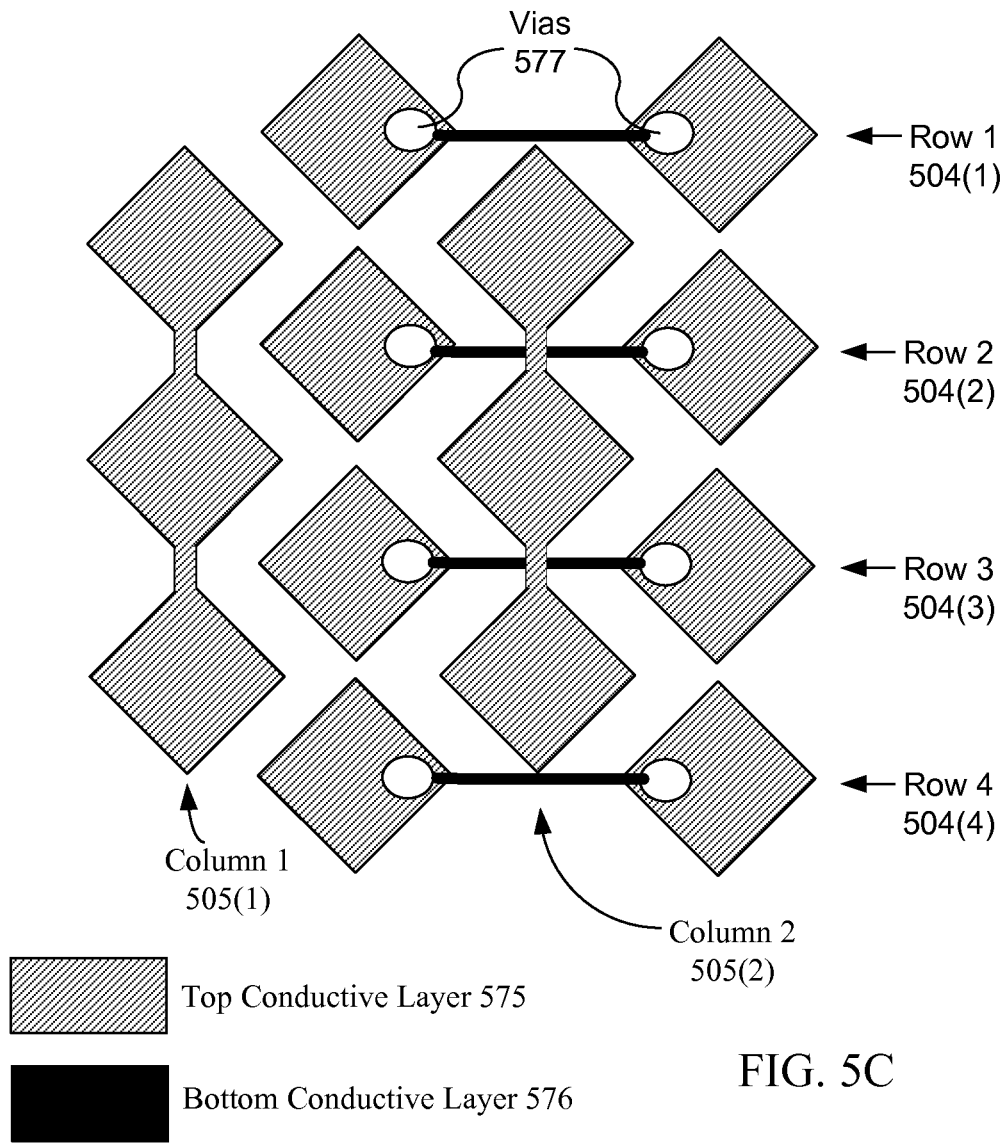
FIG. 5C illustrates a top-side view of one embodiment of a two-layer touch-sensor pad.
Figure 5D:
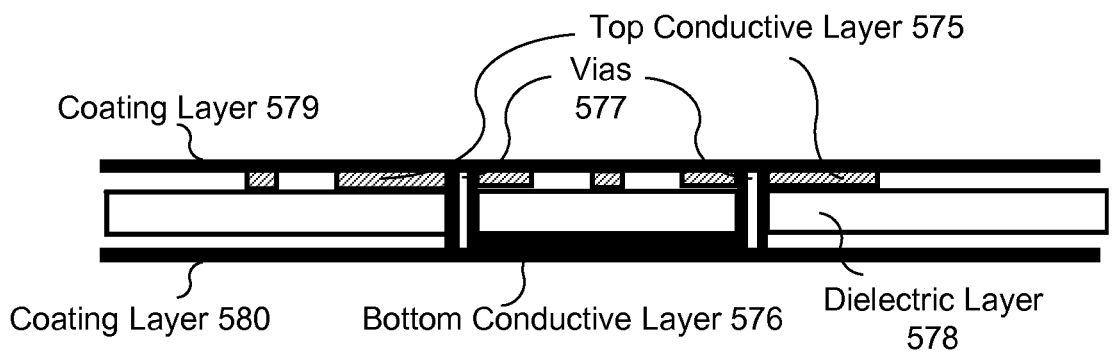
FIG. 5D illustrates a side view of one embodiment of the two-layer touch-sensor pad of FIG. 5C.

FIGS. 5C and 5D illustrate top-side and side views of one embodiment of a two-layer touch-sensor pad. Touch-sensor pad, as illustrated in FIGS. 5C and 5D, include the first two columns 505(1) and 505(2), and the first four rows 504(1)-504(4) of sensor array 500. The sensor elements of the first column 501(1) are connected together in the top conductive layer 575, illustrated as hashed diamond sensor elements and connections. The diamond sensor elements of each column, in effect, form a chain of elements. The sensor elements of the second column 501(2) are similarly connected in the top conductive layer 575. The sensor elements of the first row 504(1) are connected together in the bottom conductive layer 575 using vias 577, illustrated as black diamond sensor elements and connections. The diamond sensor elements of each row, in effect, form a chain of elements. The sensor elements of the second, third, and fourth rows 504(2)-504(4) are similarly connected in the bottom conductive layer 576.

As illustrated in FIG. 5D, the top conductive layer 575 includes the sensor elements for both the columns and the rows of the sensor array, as well as the connections between the sensor elements of the columns of the sensor array. The bottom conductive layer 576 includes the conductive paths that connect the sensor elements of the rows that reside in the top conductive layer 575. The conductive paths between the sensor elements of the rows use vias 577 to connect to one another in the bottom conductive layer 576. Vias 577 go from the top conductive layer 575, through the dielectric layer 578, to the bottom conductive layer 576. Coating layers 579 and 589 are applied to the surfaces opposite to the surfaces that are coupled to the dielectric layer 578 on both the top and bottom conductive layers 575 and 576.

It should be noted that the present embodiments should not be limited to connecting the sensor elements of the rows using vias to the bottom conductive layer 576, but may include connecting the sensor elements of the columns using vias to the bottom conductive layer 576.

When pins are not being sensed (only one pin is sensed at a time), they are routed to ground. By surrounding the sensing device (e.g., touch-sensor pad) with a ground plane, the exterior elements have the same fringe capacitance to ground as the interior elements.

In one embodiment, an IC including the processing device 210 may be directly placed on the non-sensor side of the PCB. This placement does not necessary have to be in the center. The processing device IC is not required to have a specific set of dimensions for a touch-sensor pad, nor a certain number of pins. Alternatively, the IC may be placed somewhere external to the PCB.

Figure 6:
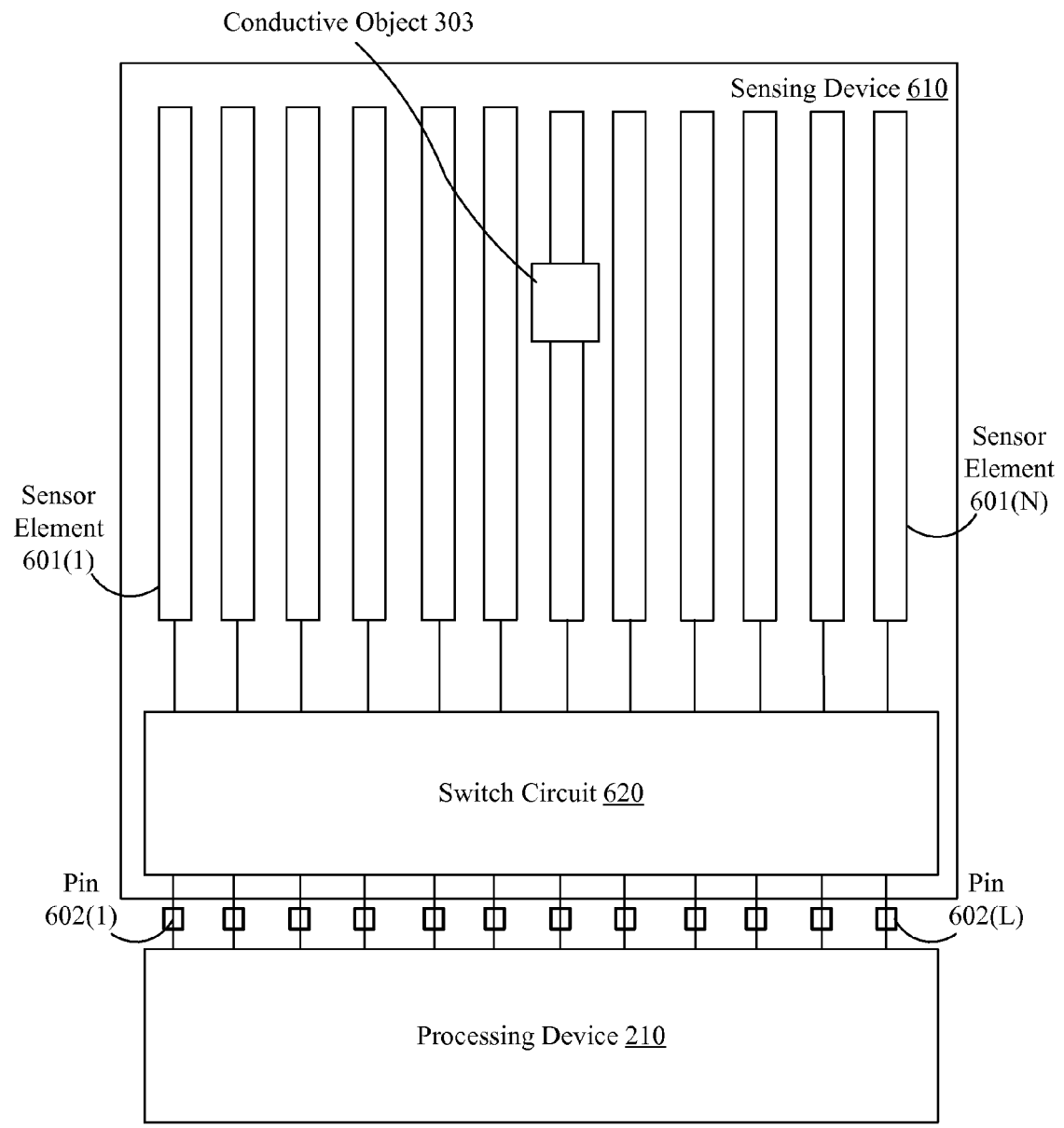
FIG. 6 illustrates a block diagram of one embodiment of a sensing device including a switch circuit.

FIG. 6 illustrates a block diagram of one embodiment of a sensing device including a switch circuit. Sensing device 610 includes switch circuit 620 and a plurality of sensor elements 601(1)-601(N), where N is a positive integer value representative of a total number of the plurality of sensor elements of the sensing device 610. Sensor elements 601(1)-601(N) are coupled to the switch circuit 620. Sensing device 610 is coupled to processing device 210. In particular, processing device 210 includes a plurality of pins 602(1)-602(L), where L is a positive integer value equal to the number of pins, and the switch circuit 620 is coupled to the plurality of pins 602(1)-602(L).

Sensor elements 601(1)-601(N) are illustrated as vertical bars (e.g., rectangular shaped bars. It should be noted that other shapes may be used for the sensor elements, such as diamond shapes, as described above. These sensor elements 601(1)-601(N) may be part of a multi-dimension sensor array, or alternatively, of a single dimension sensor array. The sensor array may be one dimensional, detecting movement in one axis. The sensor array may also be two dimensional, detecting movements in two axes. The multi-dimension sensor array comprises a plurality of sensor elements, organized as rows and columns, and may be used in a touch-sensor pad (e.g., 220). The single-dimension sensor array comprises a plurality of sensor elements, organized as rows, or alternatively, as columns, and may be used in a touch-sensor slider (e.g., 230).

Sensor elements 601(1)-601(N) are configured to detect a presence of a conductive object 303 on the sensing device 610. The switch circuit 620 is configured to group the plurality of sensor elements 601(1)-601(N) into multiple first scan groups and a second scan group.

The processing device 210 includes one or more capacitance sensors 201 coupled to the circuit switch 620 via pins 602(1)-602(L). The capacitance sensors are configured to measure capacitance on the plurality of sensor elements 601(1)-601(N).

The switch circuit may include first and second settings. The first setting is configured to couple each capacitance sensor of the one or more capacitance sensors of the processing device 210 to a first scan group of the multiple first scan groups. Each sensor element of the each first scan group is coupled together. The second setting is configured to couple the one or more capacitance sensors to two or more sensor elements of a selected first scan group.

Each first scan group includes a number of sensor elements that is equal to $\sqrt{N}$, where N is a positive integer value representative of a total number of the plurality of sensor elements 601(1)-601(N) of the sensing device 610. Accordingly, the embodiments described herein may include the advantage of reducing an average scan rate to detect the position of the conductive object on the sensing device. In one exemplary embodiment, the processing device 210 is configured to detect the average scan rate to detect the position is approximately $(2\sqrt{N}+1)/2$. Unlike the conventional design, which locates the contacting point of the conductive object in $(N+1)/2$ using a linear search algorithm, the embodiments described herein include N number or sensor elements grouped into $\sqrt{N}$, each group having $\sqrt{N}$ sensor elements. In the first scan, maximally $\sqrt{N}$ cycles are needed to scan $\sqrt{N}$ groups (e.g., coarse scan). In the second scan, maximally $\sqrt{N}$ cycles are needed to scan $\sqrt{N}$ sensor elements (e.g., fine scan). Accordingly, the scan rate is $2\sqrt{N}$. In another embodiment, the switch circuit is configured to dynamically partition the second scan group (e.g., fine scan group) such that the contact point (e.g., sensor element that detects the presence of the conductive object) is in the center of the second scan group. In this embodiment, the average scan rate is approximately $(2\sqrt{N}+1)/2$.

In another embodiment, the processing device 210 may perform a first scan, on average, in approximately $(\sqrt{N}+1)/2$, and the second scan, on average, in approximately $(\sqrt{N}+1)/2$, resulting in an average scan rate of approximately $(2\sqrt{N}+1)/2$.

Figure 7A:
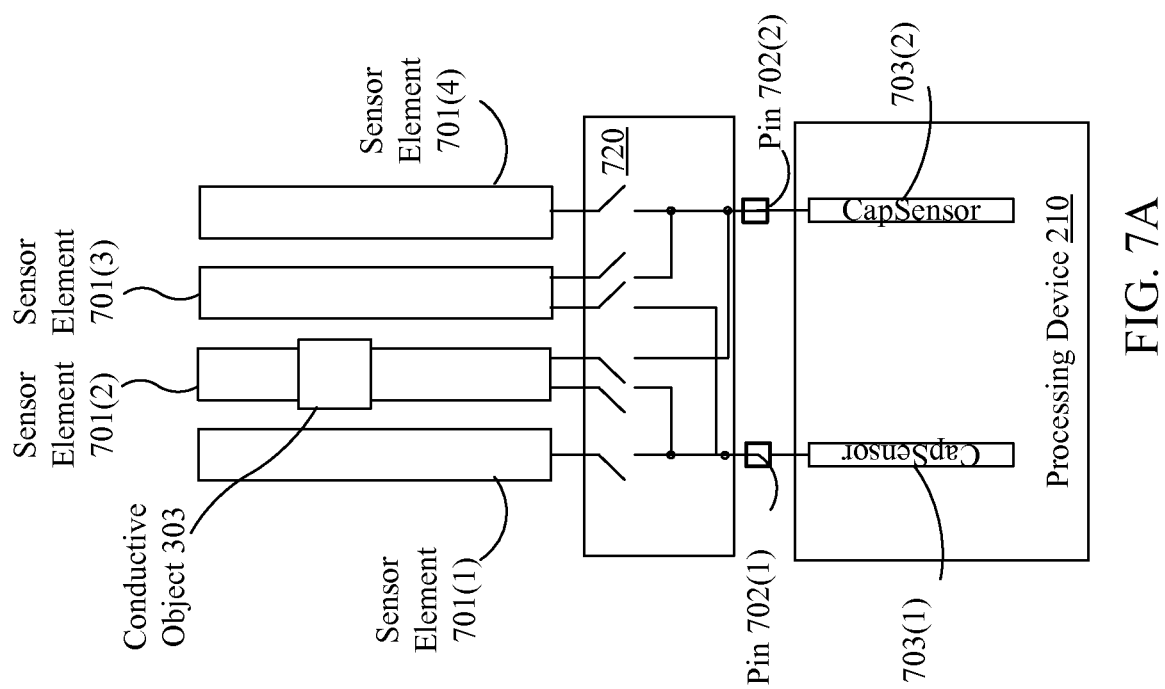
FIG. 7A illustrates a block diagram of one exemplary embodiment of switch circuit.

FIG. 7A illustrates a block diagram of one exemplary embodiment of a switch circuit. The switch circuit 720 is coupled to 4 sensor elements 701(1)-701(4) of sensing device 610, and two capacitance sensors 703(1)-703(2) of processing device 210 via pins 702(1) and 702(2). The processing device 210 is configured to detect the presence of the conductive object 303 on the sensing device 610. To detect the presence of the conductive object 303, the processing device 210 may sequentially scan the sensor elements 701(1)-701(4) to determine the capacitance variation on the sensor elements to detect the presence and/or the position of the conductive object 303 on the sensing device 610. The switch circuit 720 may be configured in first or second settings 710 and 720, respectively. First setting 710 and second setting 730 are illustrated and described with respect to FIG. 7B and FIG. 7C, respectively.

FIG. 7B illustrates a block diagram of the switch circuit of FIG. 7A in a first setting. In first setting 710, switch circuit 720 is configured to couple capacitance sensors 703(1) and 703(2) to groups of sensor elements, groups 704 and 705. The first group 704 includes the first and second sensor elements 701(1) and 701(2). The second group 705 includes the third and fourth sensor elements 701(3) and 701(4). During the first scan, the sensor elements of each group are coupled together (e.g., coupled to the same capacitance sensor). The processing device 210 scans the two groups 704 and 705 during the first scan using capacitance sensors 703(1) and 703(2), and detects the presence of the conductive object 303 in the first area using the capacitance sensors 703(1) and 703(2). The first area is less than the area of the sensing device. In particular, the first area is the area of the group (e.g., 704) that detects the presence of the conductive object 303. The processing device 210 then selects the capacitance sensor (e.g., in this case, capacitance sensor 703(1)) coupled to the group (e.g., 704) that includes the first area in which the presence of the conductive object 303 is detected using the first scan. Alternatively, the processing device 210 selects the group that includes the first area in which the presence of the conductive object is detected using the first scan. Information regarding which capacitance sensor or group is selected may be used by the second setting for the second scan, described below.

FIG. 7C illustrates a block diagram of the switch circuit of FIG. 7A in a second setting. In second setting 730, switch circuit 720 is configured to couple the capacitance sensors 703(1) and 703(2) to the two sensor elements 701(1) and 701(2), respectively, of the selected group 707. The selected group 707 may be determined using the information obtained during the first scan regarding the selected group or selected capacitance sensor. In one embodiment, the selected group 707 includes the same sensor elements of the group that detected the presence of the conductive object 303 on the sensing device 610 (e.g., group 704). Alternatively, the selected group of sensor elements may include sensor elements that surround the sensor element that detected the presence of the conductive object 303, even though one or more of these sensors may belong to a different group during the first scan. The selected group 707 includes the first and second sensor elements 701(1) and 701(2). During the second scan, the sensor elements of each group are not coupled together (e.g., not coupled to the same capacitance sensor), but are coupled to individual capacitance sensors. In particular, capacitance sensor 703(1) is coupled to sensor element 701(1), and capacitance sensor 703(2) is coupled to sensor element 701(2). The processing device 210 scans the two sensor elements 701(1) and 701(2) during the second scan using capacitance sensors 703(1) and 703(2), and detects the presence of the conductive object 303 within the first area using the capacitance sensors 703(1) and 703(2). The processing device 210 then selects the capacitance sensor (e.g., in this case, capacitance sensor 703(2)) coupled to the sensor element (e.g., 701(2)) on which the presence of the conductive object 303 is detected using the second scan.

Figure 8A:
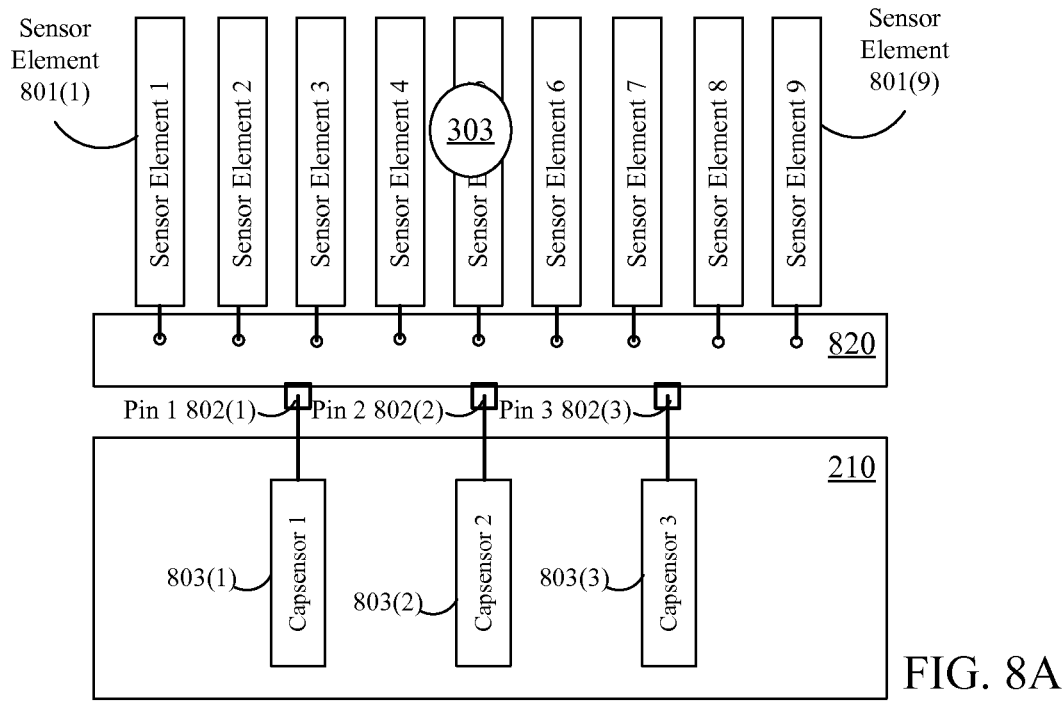
FIG. 8A illustrates a block diagram of another exemplary embodiment of a switch circuit.

FIG. 8A illustrates a block diagram of another exemplary embodiment of a switch circuit. The switch circuit 820 is coupled to 9 sensor elements 801(1)-801(9) of sensing device 610, and three capacitance sensors 803(1)-803(8) of processing device 210 via pins 802(1)-802(3). The processing device 210 is configured to detect the presence of the conductive object 303 on the sensing device 610. To detect the presence of the conductive object 303, the processing device 210 may sequentially scan the sensor elements 801(1)-801(9) to determine the capacitance variation on the sensor elements to detect the presence and/or the position of the conductive object 303 on the sensing device 610. The switch circuit 820 may be configured in first or second settings 810 and 820, respectively. First setting 810 and second setting 820 are illustrated and described with respect to FIG. 8B and FIG. 8C, respectively.

Figure 8B:
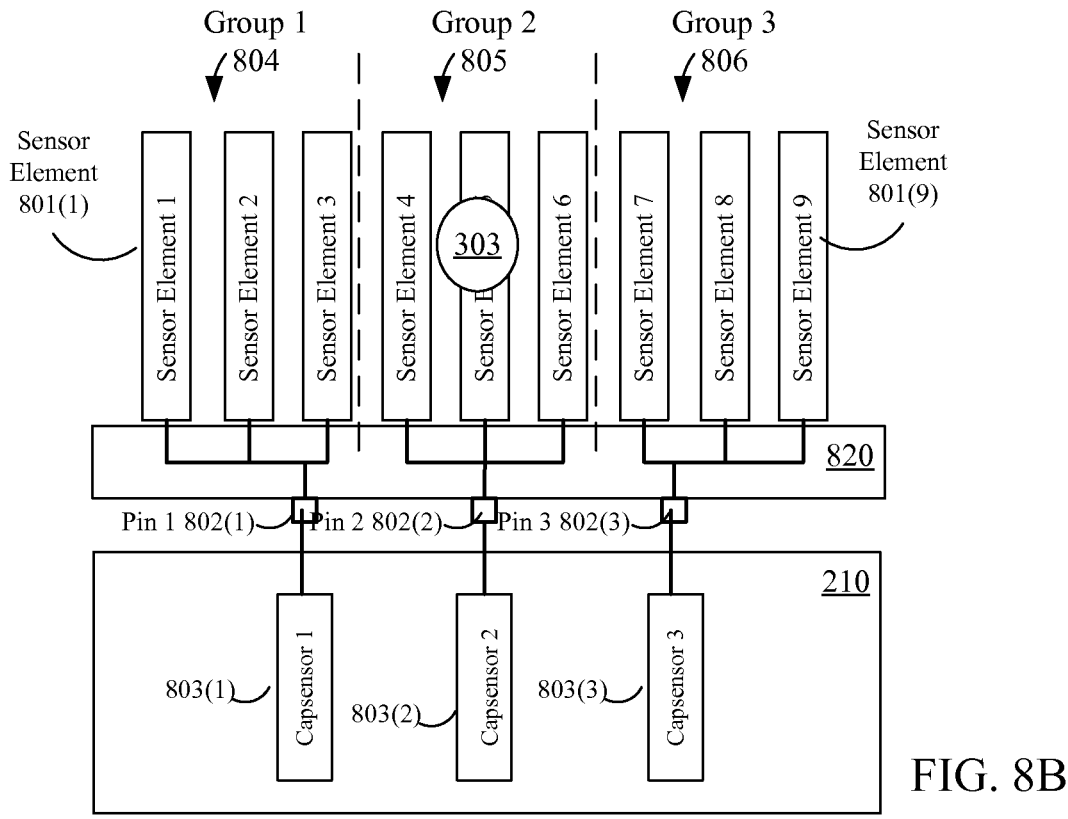
FIG. 8B illustrates a block diagram of the switch circuit of FIG. 8A in a first setting.

FIG. 8B illustrates a block diagram of the switch circuit of FIG. 8A in a first setting. In first setting 810, switch circuit 820 is configured to couple capacitance sensors 803(1)-803(3) to groups of sensor elements, groups 804, 805, and 806, respectively. The first group 804 includes the first, second, and third sensor elements 801(1)-801(3). The second group 805 includes the fourth, fifth, and sixth sensor elements 801(4)-801(6). The third group 806 includes the seventh, eighth, and ninth sensor elements 801(7)-801(9). During the first scan, the sensor elements of each group are coupled together (e.g., coupled to the same capacitance sensor). The processing device 210 scans the three groups 804, 805, and 806 during the first scan using capacitance sensors 803(1)-803(3), and detects the presence of the conductive object 303 in the first area using the capacitance sensors 803(1)-803(3). The first area is less than the area of the sensing device. In particular, the first area is the area of the group (e.g., 805) that detects the presence of the conductive object 303. The processing device 210 then selects the capacitance sensor (e.g., in this case, capacitance sensor 803(2)) coupled to the group (e.g., 805) that includes the first area in which the presence of the conductive object is detected using the first scan. Alternatively, the processing device 210 selects the group that includes the first area in which the presence of the conductive object is detected using the first scan. Information regarding which capacitance sensor or group is selected may be used by the second setting for the second scan, described below.

Figure 8C:
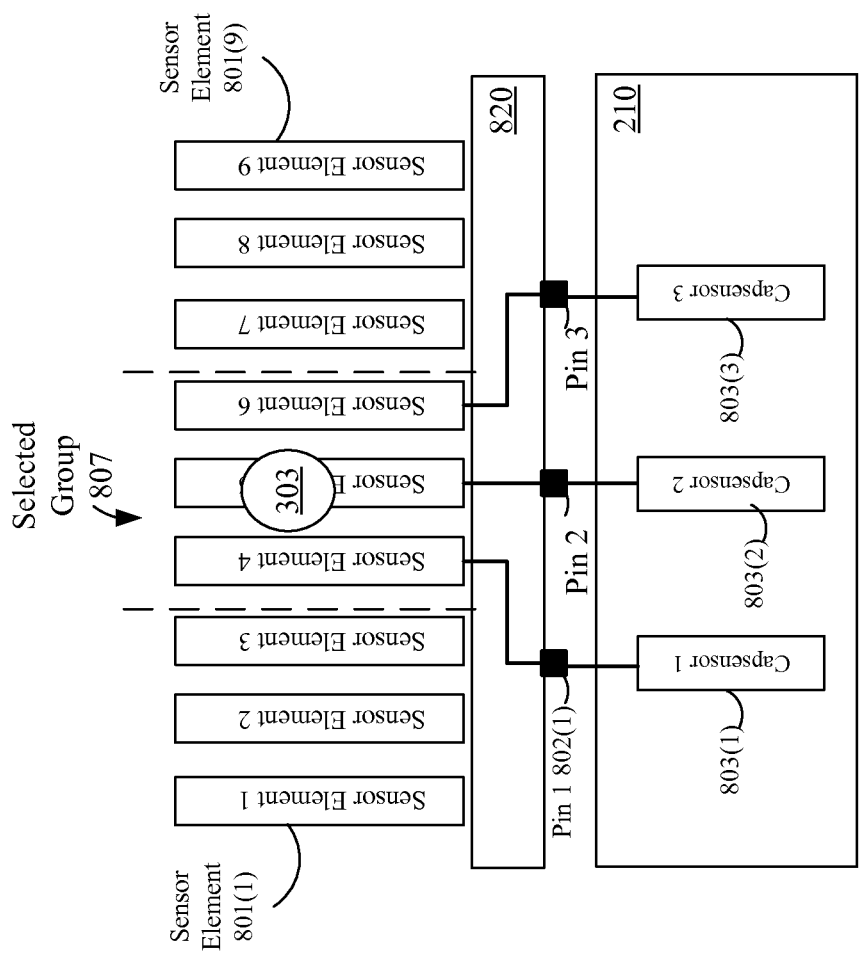
FIG. 8C illustrates a block diagram of the switch circuit of FIG. 8A in a second setting.

FIG. 8C illustrates a block diagram of the switch circuit of FIG. 8A in a second setting. In second setting 830, switch circuit 820 is configured to couple the capacitance sensors 803(1)-803(3) to the three sensor elements 801(1)-801(3), respectively, of the selected group 807 (e.g., fine scan group). The selected group 807 may be determined using the information obtained during the first scan regarding the selected group or selected capacitance sensor. In one embodiment, the selected group 807 includes the same sensor elements of the group that detected the presence of the conductive object 303 on the sensing device 610 (e.g., group 805). Alternatively, the selected group of sensor elements may include sensor elements that surround the sensor element that detected the presence of the conductive object 303, even though one or more of these sensors may belong to a different group during the first scan. The selected group 807 includes the fourth, fifth, and sixth sensor elements 801(3)-801(6). During the second scan, the sensor elements of each group are not coupled together (e.g., not coupled to the same capacitance sensor), but are coupled to individual capacitance sensors. In particular, capacitance sensor 803(1) is coupled to sensor element 801(4), capacitance sensor 803(2) is coupled to sensor element 801(5), and capacitance sensor 803(2) is coupled to sensor element 801(6). The processing device 210 scans the three sensor elements 801(4), 801(5), and 801(6) during the second scan using capacitance sensors 803(1), 803(2), and 803(3), and detects the presence of the conductive object 303 within the first area using the capacitance sensors 803(1), 803(2), and 803(3). The processing device 210 then selects the capacitance sensor (e.g., in this case, capacitance sensor 803(2)) coupled to the sensor element (e.g., 801(5)) on which the presence of the conductive object 303 is detected using the second scan.

Figure 9A:
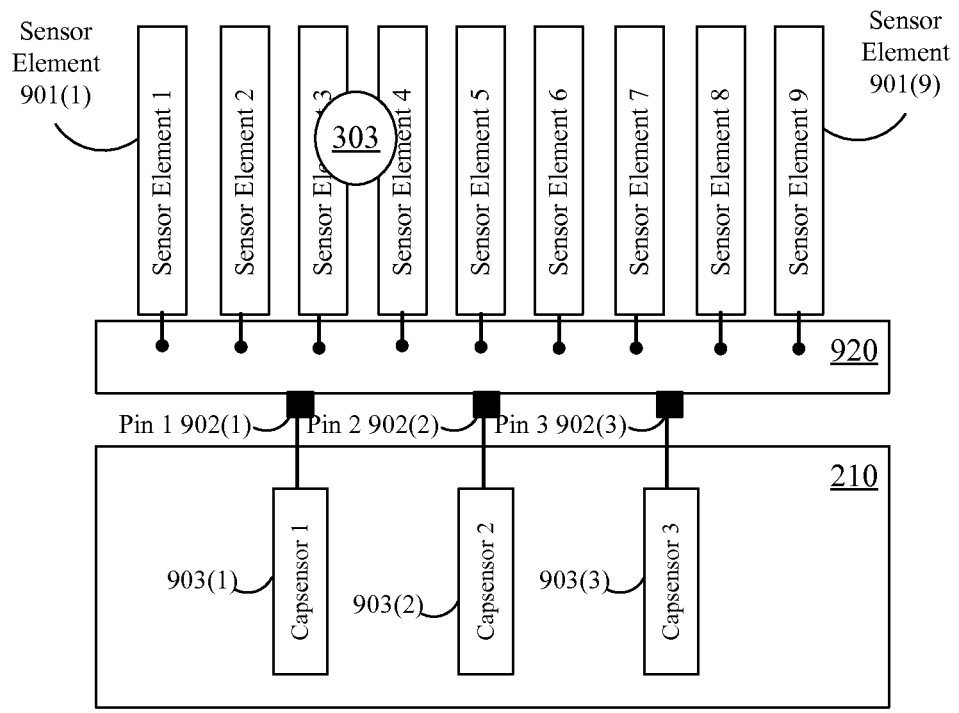
FIG. 9A illustrates a block diagram of another exemplary embodiment of a switch circuit.

FIG. 9A illustrates a block diagram of another exemplary embodiment of a switch circuit. The switch circuit 920 is coupled to 9 sensor elements 901(1)-901(9) of sensing device 610, and three capacitance sensors 903(1)-903(8) of processing device 210 via pins 902(1)-902(3). The processing device 210 is configured to detect the presence of the conductive object 303 on the sensing device 610. To detect the presence of the conductive object 303, the processing device 210 may sequentially scan the sensor elements 901(1)-901(9) to determine the capacitance variation on the sensor elements to detect the presence and/or the position of the conductive object 303 on the sensing device 610. The switch circuit 920 may be configured in first or second settings 910 and 920, respectively. First setting 910 and second setting 920 are illustrated and described with respect to FIG. 9B and FIG. 9C, respectively.

Figure 9B:
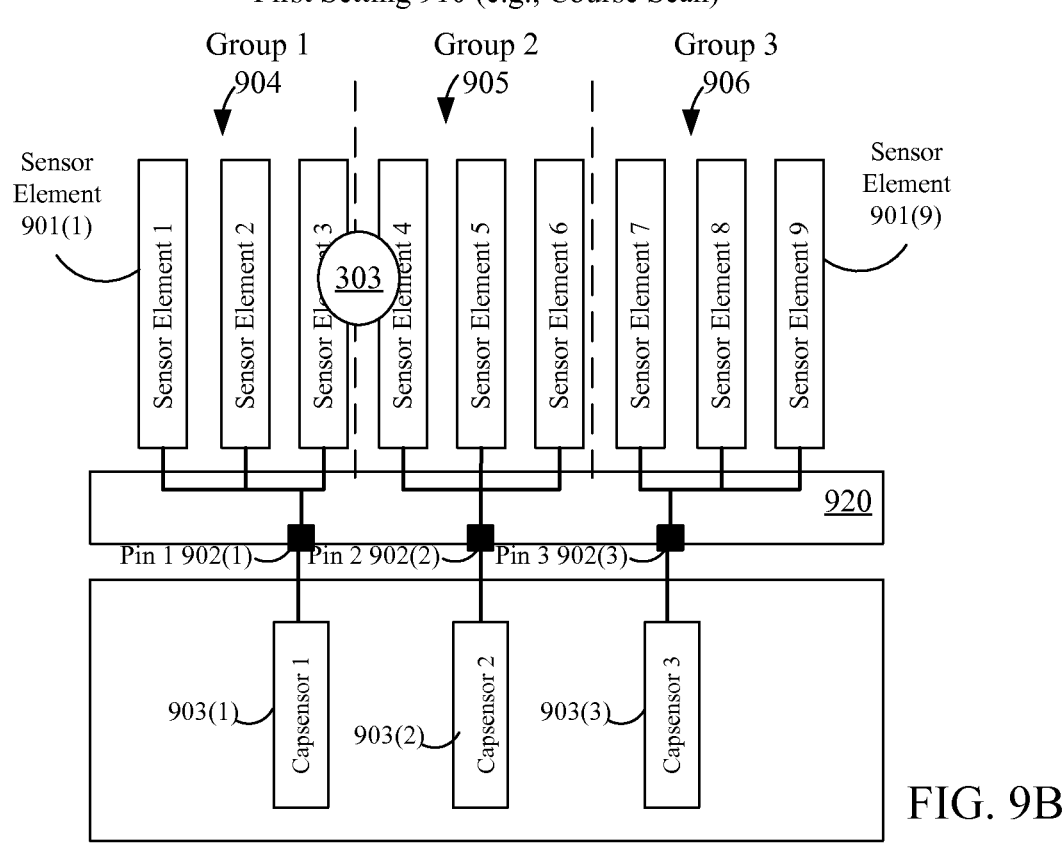
FIG. 9B illustrates a block diagram of the switch circuit of FIG. 9A in a first setting.

FIG. 9B illustrates a block diagram of the switch circuit of FIG. 9A in a first setting. In first setting 910, switch circuit 920 is configured to couple capacitance sensors 903(1)-903(3) to groups of sensor elements, groups 904, 905, and 906, respectively. The first group 904 includes the first, second, and third sensor elements 901(1)-901(3). The second group 905 includes the fourth, fifth, and sixth sensor elements 901(4)-901(6). The third group 906 includes the seventh, eighth, and ninth sensor elements 901(7)-901(9). During the first scan, the sensor elements of each group are coupled together (e.g., coupled to the same capacitance sensor). The processing device 210 scans the three groups 904, 905, and 906 during the first scan using capacitance sensors 903(1)-903(3), and detects the presence of the conductive object 303 in the first area using the capacitance sensors 903(1)-903(3). The first area is less than the area of the sensing device. In particular, the first area is the area of the group (e.g., 805) that detects the presence of the conductive object 303. The processing device 210 then selects the capacitance sensor (e.g., in this case, capacitance sensor 803(2)) coupled to the group (e.g., 805) that includes the first area in which the presence of the conductive object is detected using the first scan. Alternatively, the processing device 210 selects the group that includes the first area in which the presence of the conductive object is detected using the first scan. Information regarding which capacitance sensor or group is selected may be used by the second setting for the second scan, described below.

Figure 9C:
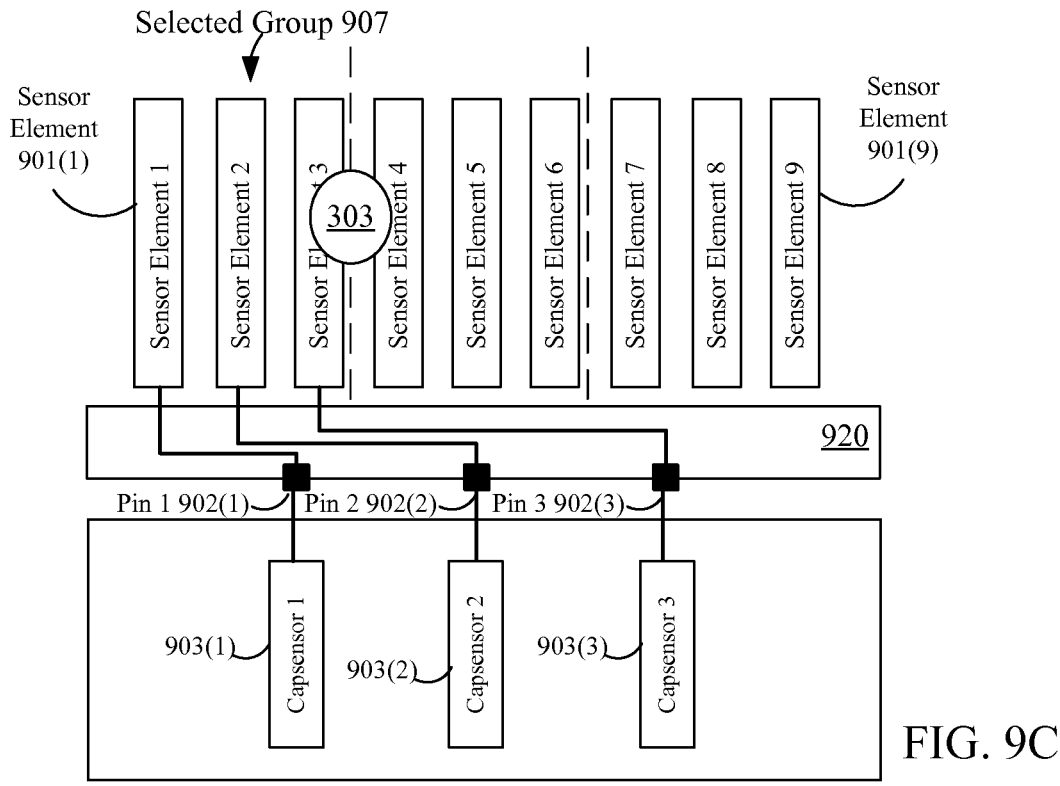
FIG. 9C illustrates a block diagram of the switch circuit of FIG. 9A in a second setting.

FIG. 9C illustrates a block diagram of the switch circuit of FIG. 9A in a second setting. In second setting 930, switch circuit 920 is configured to couple the capacitance sensors 903(1)-903(3) to the three sensor elements 801(1)-801(3), respectively, of the selected group 907 (e.g., fine scan group). The selected group 907 may be determined using the information obtained during the first scan regarding the selected group or selected capacitance sensor. In one embodiment, the selected group 907 includes the same sensor elements of the group that detected the presence of the conductive object 303 on the sensing device 610 (e.g., group 904). Alternatively, the selected group of sensor elements may include sensor elements that surround the sensor element that detected the presence of the conductive object 303, even though one or more of these sensors may belong to a different group during the first scan. The selected group 907 includes the first, second, and third sensor elements 801(1)-801(3). During the second scan, the sensor elements of each group are not coupled together (e.g., not coupled to the same capacitance sensor), but are coupled to individual capacitance sensors. In particular, capacitance sensor 903(1) is coupled to sensor element 901(1), capacitance sensor 903(2) is coupled to sensor element 901(2), and capacitance sensor 903(2) is coupled to sensor element 901(3). The processing device 210 scans the three sensor elements 901(1), 901(2), and 901(3) during the second scan using capacitance sensors 903(1), 903(2), and 903(3), and detects the presence of the conductive object 303 within the first area using the capacitance sensors 903(1), 903(2), and 903(3). The processing device 210 then selects the capacitance sensor (e.g., in this case, capacitance sensor 903(3)) coupled to the sensor element (e.g., 901(3)) on which the presence of the conductive object 303 is detected using the second scan.

In the previous embodiment, the processing device selected group 904 as the group that included the area in which the presence of the conductive object 303 is detected. Because the conductive object 303 is between the first and second groups 904 and 905, the processing device 210, in another embodiment, may select group 905, and detect that the presence of the conductive object 303 is on sensor element 901(4), similarly to detecting the conductive object on 901(3) as described above.

Figure 9D:
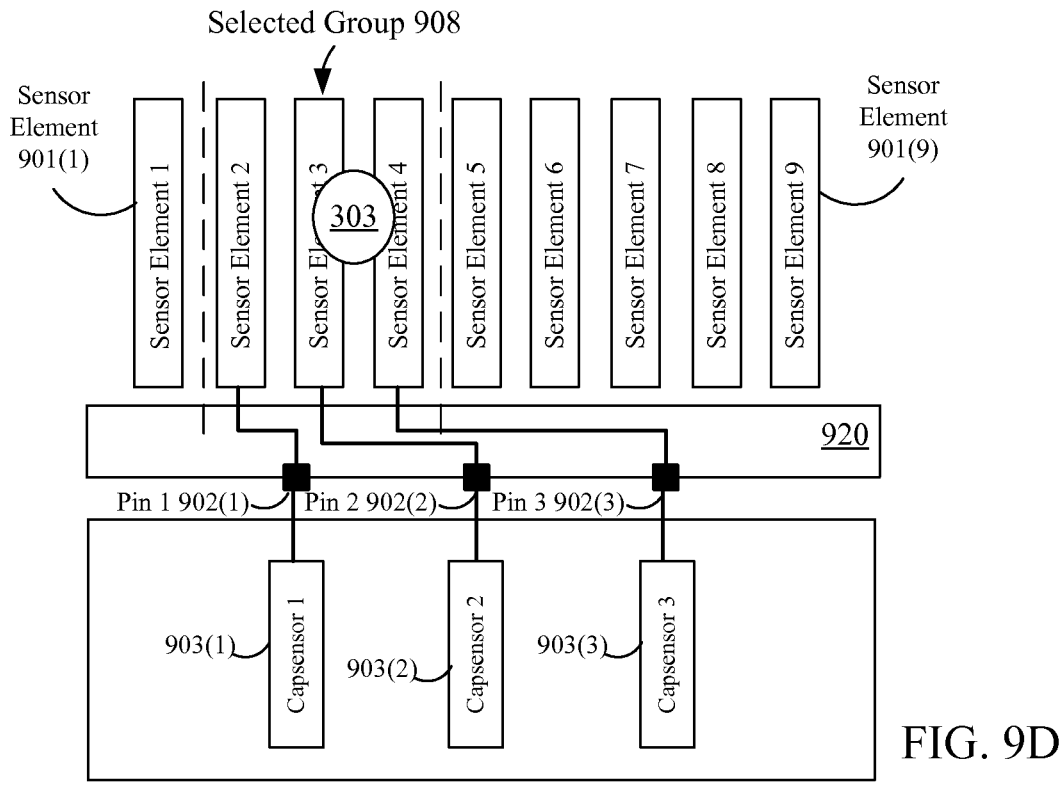
FIG. 9D illustrates a block diagram of the switch circuit of FIG. 8A in a second setting.

FIG. 9D illustrates a block diagram of the switch circuit of FIG. 8A in a second setting. In second setting 940, switch circuit 920 is configured to couple the capacitance sensors 903(1)-903(3) to the three sensor elements 801(2)-801(4), respectively, of the selected group 908 (e.g., fine scan group). As previously mentioned, the selected group 908 may be determined using the information obtained during the first scan regarding the selected group or selected capacitance sensor. For example, if the conductive object 303 is detected by 2 adjacent groups, groups 904 and 905, then it can be determined that the presence of the conductive object 303 is located in the middle, between groups 904 and 905. Using this information, the selected group 908 may be dynamically grouped to include sensor elements from both group 904 and group 905, placing the selected group 908 in the middle, between groups 904 and 905. In this particular embodiment, the switch circuit 920 dynamically partitions the selected group 908. In other words, instead of using the sensor elements of only one of the groups (e.g., 901(1)-901(3) of group 904, or 901(4)-901(6) of group 905) that detected the conductive object 303 in the first scan (as described with respect to FIG. 9C), the switch circuit 920 couples the selected group 908 to include sensor elements 901(2)-901(4), such that the presence of the conductive object 303 is in the center of the selected group 908 (e.g., between groups 904 and 905 of the first scan. Accordingly, capacitance sensor 903(1) is coupled to sensor element 901(2), capacitance sensor 903(2) is coupled to sensor element 901(3), and capacitance sensor 903(3) is coupled to sensor element 901(4). In another embodiment, the switch circuit 920 may be configured in other configurations, such as coupling sensor elements 901(3)-901(5) to capacitance sensors 903(1)-903(3), respectively.

The embodiments described herein are not limited to include three capacitance sensors, or nine sensor elements, but may include any number of capacitance sensors and sensor elements. It should also be noted that the operations of processing device 210, described with respect to FIGS. 7A-7C, 8A-8D, and 9A-9D, may also be performed by a processing device of the host 250 (e.g., host processor), drivers of the host 250, the embedded controller 260, or by hardware, software, and/or firmware of other processing devices.

Unlike the conventional touch-sensor pads, in one embodiment, the switch circuit may facilitate a scan rate or speed at which the touch-sensor pad locates the position of the presence of the conductive object on the sensing device of less than approximately 30 (ms) (e.g., to complete one scan). In another embodiment, the switch circuit may facilitate a scan rate of less than approximately 12.5 ms. In another embodiment, the switch circuit may facilitate a scan rate of less than approximately 10 ms. Accordingly, a user will not notice the position "jumps" in the cursor with scan rates less than the minimum sample rate for the particular interface. Further, by reducing the scan rate, the likelihood of bottleneck in the interface is less likely to occur in data communication between the user interface device and the host.

In one embodiment, the method may include detecting a presence of a conductive object in a first area of a sensing device using a first scan of the sensing device, and detecting the presence of the conductive object to determine a position of the conductive object within the first area using a second scan of the first area of the sensing device. The first area may be less than an entire area of the sensing device. Detecting the presence of the conductive object in the first area may include, first, grouping a plurality of sensor elements of the sensing device into a plurality of first scan groups, each including two or more sensor elements coupled together during the first scan. Second, the method includes scanning the first scan groups during the first scan using one or more capacitance sensors coupled to each of the first scan groups, and detecting the presence of the conductive object on one of the first scan groups using the first scan. After the presence of the conductive object is detecting in the first area during the first scan, then the presence of the conductive object is detected to determine the position of the conductive object within the first area. This may be done by, first, grouping two or more sensor elements of the sensing device into a second scan group, which includes the two or more sensor elements of the one first scan group that detected the presence of the conductive object (e.g., selected group). Second, the method further includes scanning the second scan group during the second scan using the one or more capacitance sensors coupled to the second scan group, and detecting the presence of the conductive object on the one sensor element of the two or more sensor elements of the second scan group using the second scan.

In another embodiment, the method for detecting the presence of the conductive object to determine the position of the conductive object within the first area may include, first, detecting the presence of the conductive object on two of the first scan groups using the first scan. After the presence of the conductive object is detecting in the first area during the first scan, then the presence of the conductive object is detected to determine the position of the conductive object within the first area. This may be done by, first, grouping two or more sensor elements of the sensing device into a second scan group, which includes sensor elements from the two first scan groups that detected the presence of the conductive object. The method also includes scanning the second scan group during the second scan using the one or more capacitance sensors coupled to the second scan group, and detecting the presence of the conductive object on one sensor element of the two or more sensor elements of the second scan group using the second scan.

In one embodiment, the method of detecting the presence of the conductive object in the first area using the first scan includes grouping a plurality of sensor elements of the sensing device into a plurality of first scan groups. Each first scan group includes two or more sensor elements each coupled to a capacitance sensor. The method further includes scanning the first scan groups during the first scan using capacitance sensors coupled to each first scan group, and detecting the presence of the conductive object on one of the first scan groups using the first scan, which may include determining a sensor element of the one first scan group that detected the presence of the conductive object, grouping the plurality of sensor elements of the sensing device into a second scan group, wherein the second scan group comprises the determined sensor element and two or more sensor elements adjacent to the determined sensor element of the one first scan group that detected the presence of the conductive object; scanning the second scan group during the second scan using capacitance sensors coupled to the second scan group; and detecting the presence of the conductive object on the one sensor element of the second scan group using the second scan.

In another embodiment, the operation of detecting the presence of the conductive object in the first area using the first scan includes scanning two or more first scan groups of sensor elements during the first scan. Each first scan group of sensor elements may be separately scanned during the first scan, and each first scan group comprises two or more sensor elements may be coupled together during the first scan. The operation may further include determining the first area in which the presence of the conductive object is detected based on the first scan.

The operation of detecting the presence of the conductive object to determine the position of the conductive object within the first area using the second scan of the first area of the sensing device may include selecting a second scan group that includes the first area in which the presence of the conductive object is detected during the first scan. The second scan group includes two or more sensor elements. The operation may further include scanning the two or more sensor elements of the selected second scan group that includes the first area during the second scan. Each sensor element of the two or more sensor elements may be separately scanned during the second scan. The operation may further include selecting a sensor element of the two or more sensor elements of the selected second scan group that includes the detected presence of the conductive object based on the second scan.

The operation of scanning the two or more first scan groups of sensor elements during the first scan includes coupling one or more capacitance sensors to the two or more groups. Each sensor element of each group may be coupled to a same capacitance sensor of the one or more capacitance sensors. In one embodiment, the number of capacitance sensors is equal to the square root of the number of sensor elements of the sensing device (e.g., $\sqrt{N}$). The number of each first scan group and the second scan group may be equal to the square root of the number of sensor elements of the sensing device (e.g., $\sqrt{N}$). Alternatively, any number, and any combination of capacitance sensors, and sensor elements in the first and second scan groups may be used.

The operation of scanning two or more sensor elements of the selected first scan group during the second scan may include coupling the one or more capacitance sensors to the two or more sensor elements of the selected first scan group. Alternatively, the operation may include coupling the one or more capacitance sensors to two or more sensor elements of a second scan group. The second scan group may include sensor elements of one or more first scan group. The second scan group may include sensor elements of two adjacent first scan groups.

It should be noted that scanning the plurality of sensor elements may be done using one or more capacitance sensors. In one exemplary embodiment, one capacitance sensor may be multiplexed to connect to the sensor circuit, which determines which sensor element is being measured. Alternatively, two or more capacitance sensors may be used, with or without a multiplexer, to measure the capacitance on the plurality of sensor elements.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, etc.); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus, comprising:
a plurality of capacitive sense elements;
a first capacitance sensor and a second capacitance sensor; and
a switch circuit configured to couple the plurality of capacitive sense elements to the first and second capacitance sensors in different modes,
wherein the switch circuit is configured to couple the first capacitance sensor to a first group of two or more of the plurality of capacitive sense elements in a first mode,
wherein the switch circuit is configured to couple the second capacitance sensor to a second group of two or more of the plurality of capacitive sense elements, and
wherein the switch circuit is configured to couple at least one of the first or second capacitance sensors to individual ones of the two or more of the plurality of capacitive sense elements in one of the first or second groups in a second mode.

2. The apparatus of claim 1, wherein the switch circuit is configured to switch between the first mode and the second mode when a presence of a conductive object is detected in an area corresponding to one of the first or second groups in the first mode.

3. The apparatus of claim 1, further comprising a processing device comprising the switch circuit and the first and second capacitance sensors, wherein the processing device is configured to control the switch circuit to couple the first and second capacitance sensors to the plurality of capacitive sense elements in the first and second modes.

4. The apparatus of claim 3, wherein:
the processing device is configured to perform a first scan to detect a presence of a conductive object while the switch circuit is in the first mode;
the processing device is configured to perform a second scan when the presence of the conductive object is detected in the first scan; and
the processing device is configured to not perform the second scan when the presence of the conductive object is not detected in the first scan.

5. The apparatus of claim 4, wherein:
in the first scan, the processing device measures, using the first capacitance sensor, a first capacitance on the first group of the two or more capacitive sense elements coupled together;
in the first scan, the processing device measure, using the second capacitance sensor, a second capacitance on the second group of the two or more capacitive sense elements coupled together; and
in the second scan, the processing device measures, using at least one of the first capacitance sensor or the second capacitance sensor, a third capacitance on each individual one of the two or more capacitive sense elements of one of the first or second groups,
wherein the one group corresponds to a first area in which the presence of the conductive object is detected during the first scan, and
wherein the two or more of the plurality of capacitive sense elements in the one group are not coupled together in the second mode.

6. An apparatus, comprising:
a two-dimensional capacitive sense array comprising a plurality of rows of capacitive sense elements and a plurality of columns of capacitive sense elements;
a first capacitance sensor;
a second capacitance sensor; and
a switch circuit configured to couple the first and second capacitance sensors to the two-dimensional capacitive sense array in different modes, wherein:
in a first mode, the switch circuit is configured to couple the first capacitance sensor to a first group of two or more of the plurality of rows, and to couple the second capacitance sensor to a second group of two or more of the plurality of rows;
in a second mode, the switch circuit is configured to couple the second capacitance sensor to a third group of two or more of the plurality of columns, and to couple the second capacitance sensor to a fourth group of two or more of the plurality of columns;
in a third mode, the switch circuit is configured to couple at least one of the first capacitance sensor or the second capacitance sensor to individual ones of the two or more of the plurality of rows in one of the first or second groups of rows; and
in a fourth mode, the switch circuit is configured to couple at least one of the first capacitance sensor or the second capacitance sensor to individual ones of the two or more of the plurality of columns in one of the third or fourth groups of columns.

7. The apparatus of claim 6, wherein:
the switch circuit is configured to switch between the first mode and the third mode when a presence of a conductive object is detected in an area corresponding to the one group of rows in the first mode, and
the switch circuit is configured to switch between the second mode and the fourth mode when the presence of the conductive object is detected in the area corresponding to the one group of columns in the second mode.

8. The apparatus of claim 6, further comprising a processing device comprising the switch circuit and the first and second capacitance sensors, wherein the processing device is configured to control the switch circuit to couple the first and second capacitance sensors to the plurality of rows and plurality of columns in the first, second, third, and fourth modes.

9. The apparatus of claim 6, wherein:
the processing device is configured to perform a first scan of the first and second groups of rows to detect a presence of a conductive object while the switch circuit is in the first mode;
the processing device is configured to perform a second scan of the third and fourth groups of columns to detect a presence of the conductive object while the switch circuit is in the second mode;

the processing device is configured to perform a third scan when the presence of the conductive object is detected in the first scan;

the processing device is configured to perform a fourth scan when the presence of the conductive object is detected in the second scan; and the processing device is configured to not perform the third and fourth scan when the presence of the conductive object is not detected in the first and second scans.

10. The apparatus of claim 9, wherein:

in the first scan, the processing device measures, using the first capacitance sensor, a first capacitance on the first group of rows having the two or more rows coupled together;

in the first scan, the processing device measures, using the second capacitance sensor, a second capacitance on the second group of rows having the two or more rows coupled together;

in the second scan, the processing device measures, using the first capacitance sensor, a third capacitance on the third group of columns having the two or more columns coupled together;

in the second scan, the processing device measures, using the second capacitance sensor, a fourth capacitance on the fourth group of columns having the two or more columns coupled together;

in the third scan, the processing device measures, using the first and second capacitance sensors, capacitances on each individual one of the two or more rows of the one group of rows, wherein the one group of rows corresponds to a first area in which the presence of the conductive object is detected during the first scan, and wherein the two or more of the plurality of rows in the one group of rows are not coupled together in the third scan; and in the fourth scan, the processing device measures, using the first and second capacitance sensors, capacitances on each individual one of the two or more columns of the one group of columns, wherein the one group of columns corresponds to the first area in which the presence of the conductive object is detected during the second scan, and wherein the two or more of the plurality of columns in the one group of columns are not coupled together in the fourth scan.

11. The apparatus of claim 10, wherein the processing device is configured to perform the first, second, third, and fourth scans in the following order: the first scan, the second scan, the third scan, and the fourth scan.

12. The apparatus of claim 11, wherein the processing device is configured to perform the first, second, third, and fourth scans in the following order: the first scan, the third scan, the second scan, and the fourth scan.

13. A method, comprising coupling a plurality of capacitance capacitive sense elements to a first capacitance sensor and a second capacitance sensor in different modes, wherein said coupling comprises:

coupling, using a switch circuit, the first capacitance sensor to a first group of two or more of the plurality of capacitive sense elements in a first mode;

coupling, using the switch circuit, the second capacitance sensor to a second group of two or more of the plurality of capacitive sense elements in the first mode; and coupling, using the switch circuit, at least one of the first capacitance sensor or the second capacitance sensor to individual ones of the two or more of the plurality of capacitive sense elements in one of the first group or second group in a second mode.

14. The method of claim 13, further comprising switching between the first mode and the second mode when a presence of a conductive object is detected in an area corresponding to the one group in the first mode.

15. The method of claim 13, further comprising:

performing a first scan to detect a presence of a conductive object while the switch circuit is in the first mode; and performing a second scan when the presence of the conductive object is detected in the first scan, wherein the second scan is not performed when the presence of the conductive object is not detected in the first scan.

16. The method of claim 15, further comprising:

in the first scan, measuring a first capacitance on each of the first and second groups, each of the groups having the two or more capacitive sense elements coupled together; and in the second scan, measuring a second capacitance on each individual one of the two or more capacitive sense elements of one of the groups, wherein the one group corresponds to a first area in which the presence of the conductive object is detected during the first scan, and wherein the two or more of the plurality of capacitive sense elements in the one group are not coupled together in the second mode.

17. The method of claim 13, wherein the plurality of capacitive sense elements are arranged as a plurality of rows and a plurality of columns of a two-dimensional capacitive sense array, and wherein the method further comprises:

in the first mode, coupling the first capacitance sensor to a first group of two or more of the plurality of rows, coupling the second capacitance sensor to a second group of two or more of the plurality of rows;

coupling the first capacitance sensor to a third group of two or more of the plurality of columns;

coupling the second capacitance sensor to a fourth group of two or more of the plurality of columns; and in the second mode, coupling at least one of the first capacitance sensor or second capacitance sensor to individual ones of the two or more of the plurality of rows in one of the first and second groups of rows, and coupling at least one of the first capacitance sensor or second capacitance sensor to individual ones of the two or more of the plurality of columns in one of the third and fourth groups of columns.

18. The method of claim 17, further comprising:

performing a first scan of the first and second groups of rows to detect a presence of a conductive object while the switch circuit is in the first mode;

performing a second scan of the third and fourth groups of columns to detect a presence of the conductive object while the switch circuit is in the first mode;

performing a third scan when the presence of the conductive object is detected in the first scan; and performing a fourth scan when the presence of the conductive object is detected in the second scan.

19. The method of claim 18, further comprising:
in the first scan, measuring a first capacitance on each of the first and second groups of rows, each of the groups of rows having the two or more rows coupled together;
in the second scan, measuring a second capacitance on each of the third and fourth groups of columns, each of the groups of columns having the two or more columns coupled together; and
in the third scan, measuring a third capacitance on each individual one of the two or more rows of the one group of rows,
wherein the one group of rows corresponds to a first area in which the presence of the conductive object is detected during the first scan, and
wherein the two or more of the plurality of rows in the one group of rows are not coupled together in the third scan; and
in the fourth scan, measuring a fourth capacitance on each individual one of the two or more columns of the one group of columns,
wherein the one group of columns corresponds to the first area in which the presence of the conductive object is detected during the second scan, and
wherein the two or more of the plurality of columns in the one group of columns are not coupled together in the fourth scan.

20. The method of claim 18, wherein said performing the third scan is performed before said performing the second scan.

* * * * *